United States Patent
Su et al.

(10) Patent No.: US 12,294,545 B2
(45) Date of Patent: May 6, 2025

(54) METHOD FOR RECEIVING AND SENDING REFERENCE SIGNAL, APPARATUS, AND SYSTEM

(71) Applicant: HUAWEI TECHNOLOGIES CO., LTD., Guangdong (CN)

(72) Inventors: Yuwan Su, Shenzhen (CN); Xiang Mi, Beijing (CN); Xiaolei Tie, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 734 days.

(21) Appl. No.: 17/389,979

(22) Filed: Jul. 30, 2021

(65) Prior Publication Data

US 2021/0359822 A1 Nov. 18, 2021

Related U.S. Application Data

(63) Continuation of application No. PCT/CN2019/074722, filed on Feb. 3, 2019.

(51) Int. Cl.
H04L 5/00 (2006.01)

(52) U.S. Cl.
CPC .................. H04L 5/0053 (2013.01)

(58) Field of Classification Search
CPC ........... H04L 27/26035; H04L 27/2613; H04L 5/0044; H04L 5/0048; H04L 5/0053; H04L 5/0091
See application file for complete search history.

(56) References Cited

U.S. PATENT DOCUMENTS 8,588,166 B2 * 11/2013 Han ..................... H04L 5/001
  370/329
9,584,270 B2 * 2/2017 Arnott .................. H04B 7/2621
(Continued)

FOREIGN PATENT DOCUMENTS

CN  102413572 A  4/2012
CN  104126280 A  10/2014
(Continued)

OTHER PUBLICATIONS

3GPP TSG-RAN1 Meeting #93, R1-1807930, Introduction of enhancements to operation in unlicensed spectrum, Busan, Korea, May 21-25, 2018, Ericsson, total 65 pages.
(Continued)

*Primary Examiner* — Dung B Huynh
(74) *Attorney, Agent, or Firm* — WOMBLE BOND DICKINSON (US) LLP

(57) ABSTRACT

Embodiments of this application provide a method for receiving and sending a reference signal, an apparatus, and a system, so that a network device can correctly demodulate uplink data of different terminal devices of a same cell. This solution is applicable to a wireless communications system including a first cell. The first cell includes a plurality of terminal devices that can transmit uplink data on a same time-frequency resource. A first terminal device in the plurality of terminal devices determines an index of a first sequence based on a first parameter value, and generates a first reference signal based on the first sequence indicated by the index of the first sequence. Then, the first terminal device sends the first reference signal to the network device. The first parameter value is different from a parameter value corresponding to another terminal device in the plurality of terminal devices.

14 Claims, 7 Drawing Sheets

(56) References Cited

U.S. PATENT DOCUMENTS

| | | | | |
|---|---|---|---|---|
| 9,813,957 | B2* | 11/2017 | Chae | H04W 8/005 |
| 10,601,621 | B2* | 3/2020 | Aiba | H04W 72/23 |
| 11,082,996 | B2* | 8/2021 | Li | H04L 1/0061 |
| 11,533,120 | B2* | 12/2022 | Liang | H04L 27/2613 |
| 2012/0224546 | A1* | 9/2012 | Chang | H04W 76/14 370/329 |
| 2012/0263142 | A1* | 10/2012 | Ahn | H04L 27/2602 370/330 |
| 2012/0320847 | A1* | 12/2012 | Nam | H04W 72/20 370/329 |
| 2013/0039285 | A1* | 2/2013 | Sorrentino | H04W 72/51 370/329 |
| 2013/0121266 | A1* | 5/2013 | Ko | H04L 5/0026 370/329 |
| 2013/0170441 | A1* | 7/2013 | Sorrentino | H04L 5/0062 370/329 |
| 2013/0329660 | A1* | 12/2013 | Noh | H04L 5/0053 370/329 |
| 2014/0206342 | A1* | 7/2014 | Zhou | H04L 5/0053 455/422.1 |
| 2014/0241303 | A1* | 8/2014 | Yoon | H04L 27/2613 370/329 |
| 2014/0247799 | A1* | 9/2014 | Suzuki | H04J 13/22 370/329 |
| 2014/0301324 | A1* | 10/2014 | Cheng | H04L 5/0055 370/329 |
| 2014/0307661 | A1* | 10/2014 | Wu | H04J 11/0069 370/329 |
| 2014/0314026 | A1* | 10/2014 | Ko | H04W 28/04 370/329 |
| 2014/0369286 | A1* | 12/2014 | Noh | H04W 72/23 370/329 |
| 2014/0376356 | A1* | 12/2014 | Park | H04L 1/00 370/203 |
| 2014/0376484 | A1* | 12/2014 | Park | H04W 72/21 370/329 |
| 2015/0023270 | A1* | 1/2015 | Park | H04L 5/0048 370/329 |
| 2015/0036607 | A1* | 2/2015 | Park | H04L 27/2613 370/329 |
| 2015/0124673 | A1* | 5/2015 | Ouchi | H04W 52/58 370/311 |
| 2015/0223231 | A1* | 8/2015 | Noh | H04L 1/00 370/329 |
| 2015/0304994 | A1* | 10/2015 | Kim | H04L 27/2601 370/280 |
| 2015/0319718 | A1* | 11/2015 | Yang | H04W 76/15 370/252 |
| 2017/0099174 | A1* | 4/2017 | Kim | H04L 27/2607 |
| 2017/0311313 | A1* | 10/2017 | Park | H04L 27/2613 |
| 2017/0317808 | A1* | 11/2017 | You | H04W 72/0446 |
| 2018/0006864 | A1* | 1/2018 | Hwang | H04L 5/0094 |
| 2018/0048446 | A1* | 2/2018 | Jiang | H04W 72/21 |
| 2018/0083752 | A1* | 3/2018 | Kim | H04W 72/0453 |
| 2018/0152950 | A1* | 5/2018 | Xiong | H04W 72/0446 |
| 2018/0199359 | A1* | 7/2018 | Cao | H04L 1/1896 |
| 2018/0295651 | A1* | 10/2018 | Cao | H04W 74/0833 |
| 2019/0007248 | A1* | 1/2019 | Takeda | H04L 1/1861 |
| 2019/0075582 | A1* | 3/2019 | Kim | H04L 1/1607 |
| 2019/0089504 | A1* | 3/2019 | Hwang | H04L 27/26 |
| 2019/0159153 | A1* | 5/2019 | Li | H04L 27/26 |
| 2019/0207730 | A1* | 7/2019 | Park | H04J 13/0055 |
| 2019/0215209 | A1* | 7/2019 | Tang | H04L 5/0094 |
| 2019/0215849 | A1* | 7/2019 | Ye | H04L 5/0094 |
| 2019/0215872 | A1* | 7/2019 | Park | H04W 52/0216 |
| 2019/0245664 | A1* | 8/2019 | Kim | H04L 5/0021 |
| 2019/0246424 | A1* | 8/2019 | Zhang | H04L 1/1671 |
| 2019/0268904 | A1* | 8/2019 | Miao | H04W 52/02 |
| 2019/0357232 | A1* | 11/2019 | Raghothaman | H04L 5/0048 |
| 2019/0372805 | A1* | 12/2019 | Tang | H04L 5/0012 |
| 2020/0022127 | A1* | 1/2020 | Li | H04W 72/20 |
| 2020/0022162 | A1* | 1/2020 | Yang | H04B 1/7143 |
| 2020/0044801 | A1* | 2/2020 | Wang | H04L 5/0094 |
| 2020/0084776 | A1* | 3/2020 | Zhang | H04W 72/542 |
| 2020/0092056 | A1* | 3/2020 | Lei | H04L 5/0012 |
| 2020/0145266 | A1* | 5/2020 | Yang | H04L 27/2082 |
| 2020/0146032 | A1* | 5/2020 | Bae | H04L 1/1819 |
| 2020/0153588 | A1* | 5/2020 | Hwang | H04L 5/0051 |
| 2020/0186189 | A1* | 6/2020 | Herath | H04B 1/707 |
| 2020/0220681 | A1* | 7/2020 | Yang | H04L 5/001 |
| 2020/0235900 | A1* | 7/2020 | Yang | H04L 5/0094 |
| 2020/0274630 | A1* | 8/2020 | Liang | H04L 27/2613 |
| 2020/0389271 | A1* | 12/2020 | Matsumura | H04L 5/0051 |
| 2020/0396698 | A1* | 12/2020 | Bala | H04L 5/0005 |
| 2020/0403653 | A1* | 12/2020 | Matsumura | H04W 72/0446 |
| 2021/0022117 | A1* | 1/2021 | Yi | H04L 5/0044 |
| 2021/0176110 | A1* | 6/2021 | Gou | H04L 5/0007 |
| 2021/0176756 | A1* | 6/2021 | Matsumura | H04B 1/715 |
| 2021/0185706 | A1* | 6/2021 | Park | H04J 13/004 |
| 2022/0116881 | A1* | 4/2022 | Shin | H04L 1/1861 |
| 2023/0269044 | A1* | 8/2023 | Gong | H04J 11/005 370/330 |

FOREIGN PATENT DOCUMENTS

| | | |
|---|---|---|
| CN | 106134140 A | 11/2016 |
| CN | 106817210 A | 6/2017 |
| CN | 108173633 A | 6/2018 |
| EP | 3297239 A1 | 3/2018 |

OTHER PUBLICATIONS

Panasonic, Discussion on PUSCH DMRS configuration and signalling. 3GPP TSG-RAN WG1 Meeting #69, Prague, Czech Repblic, May 21-25, 2012, R1-122195, 4 pages.

Huawei, HiSilicon, Dynamic signaling of PUSCH DMRS for UL CoMP. 3GPP TSG RAN WGl Meeting #70, Qingdao, China, Aug. 13-17, 2012, R1-123112, 4 pages.

* cited by examiner

METHOD FOR RECEIVING AND SENDING REFERENCE SIGNAL, APPARATUS, AND SYSTEM

CROSS-REFERENCE TO RELATED APPLICATIONS

This application is a continuation of International Application No. PCT/CN2019/074722, filed on Feb. 3, 2019, the disclosure of which is hereby incorporated by reference in its entirety.

TECHNICAL FIELD

This application relates to the communication field, and in particular, to a method for receiving and sending a reference signal, an apparatus, and a system.

BACKGROUND

When a terminal device needs to transmit uplink data, an existing flow usually includes: The uplink data reaches the terminal device-the terminal device applies to a network device for an uplink transmission resource-the network device sends uplink transmission scheduling information to the terminal device-the terminal device performs uplink transmission based on the uplink transmission scheduling information-the network device feeds back, to the terminal device based on a demodulation status of the uplink data, whether the uplink data is successfully received.

With development of an internet of things (IoT) technology, an IoT application also poses increasingly high requirements for an IoT design. To meet these requirements, the Mobile Communication Standardization Organization 3rd generation partnership project (3GPP) adopted a new research project at the radio access network (RAN) #62 plenary meeting to study methods for supporting the Internet of Things with extremely low complexity and low costs in cellular networks. In addition, the research project was initiated as a narrow band internet of things (NB-IoT) project at the RAN #69 meeting. At present, an NB-IoT release 16 is studying uplink (UL) grant-free transmission, and a flow thereof includes: Uplink data reaches a terminal device-the terminal device directly performs uplink transmission on preconfigured resources in a pre-specified sending manner—a network device feeds back, to the terminal device based on a demodulation status of the uplink data, whether the uplink data is successfully received. It can be learned that, for the uplink grant-free transmission, the terminal device does not need to apply to the network device for an uplink transmission resource, and does not need to wait for the network device to send uplink transmission scheduling information to the terminal device, in other words, a procedure is reduced. Therefore, the uplink grant-free transmission has advantages such as a reduced power consumption delay and reduced signaling overheads. Particularly, in the uplink grant-free transmission, the network device may configure different uplink grant-free transmission resources for different terminal devices, or may configure same or partially overlapping uplink grant-free transmission resources for different terminal devices. Compared with dedicated resources, shared resources facilitate reducing network resource overheads and improving spectrum utilization.

In a conventional technology, when different terminal devices of a same cell transmit uplink data on a shared resource, based on an existing method for generating a reference signal (for example, a demodulation reference signal (DMRS)), the different terminal devices of the same cell generate same reference signals. However, the different terminal devices of the same cell transmit uplink data on a same time-frequency resource by using the same reference signals. In this case, the network device cannot distinguish the reference signals used by the different terminal devices, and therefore cannot correctly demodulate the uplink data of the different terminal devices.

SUMMARY

Embodiments of this application provide a method for receiving and sending a reference signal, an apparatus, and a system, so that a network device can correctly demodulate uplink data of different terminal devices of a same cell to the greatest extent.

To achieve the foregoing objective, the embodiments of this application use the following technical solutions.

According to a first aspect, a method for sending a reference signal is provided. The method is applicable to a wireless communications system. The wireless communications system includes a first cell. The first cell includes a plurality of terminal devices capable of transmitting uplink data on a same time-frequency resource. The plurality of terminal devices includes a first terminal device. The method includes: The first terminal device determines an index of a first sequence based on a first parameter value corresponding to the first terminal device, where the first parameter value is different from a parameter value corresponding to another terminal device in the plurality of terminal devices. The first terminal device generates a reference signal based on the first sequence indicated by the index of the first sequence. The first terminal device sends the reference signal to a network device. Based on this solution, because the plurality of terminal devices that can transmit the uplink data on the same time-frequency resource and that are of the same cell determine indexes of first sequences by using different parameter values, the determined indexes of the first sequences may be different. Further, reference signals generated based on the first sequences indicated by the indexes of the first sequences may also be different. Further, the different terminal devices of the same cell may transmit the uplink data on the same time-frequency resource by using, to the greatest extent, different reference signals, so that the network device can distinguish, to the greatest extent, the reference signals used by the different terminal devices, thereby correctly demodulating the uplink data of the different terminal devices.

In an embodiment, before that the first terminal device determines an index of a first sequence based on a first parameter value corresponding to the first terminal device, the first terminal device receives a system message or higher layer signaling from the network device, where the system message or the higher layer signaling includes the first parameter value corresponding to the first terminal device. Based on this solution, the first terminal device may obtain the first parameter value corresponding to the first terminal device.

In an embodiment, before that the first terminal device determines an index of a first sequence based on a first parameter value corresponding to the first terminal device, the first terminal device determines the first parameter value corresponding to the first terminal device based on an identifier of the first terminal device. Based on this solution, the first terminal device may obtain the first parameter value corresponding to the first terminal device.

In an embodiment, in determining the index of a first sequence based on a first parameter value corresponding to the first terminal device, the first terminal device determines the index of the first sequence based on the first parameter value, a group hopping pattern, a sequence shift pattern, and one or a plurality of specified values, where the group hopping pattern is determined based on a second sequence, and the sequence shift pattern is determined based on a cell identifier of the first cell. Based on this solution, the first terminal device may determine the index of the first sequence based on the first parameter value corresponding to the first terminal device.

In an embodiment, the first parameter value, the group hopping pattern, the sequence shift pattern, the one or plurality of specified values, and the index of the first sequence satisfy the following first formula: $u=(f_{gh}(n_s)+f_{ss}+$ First parameter value)mod A; or $u=(f_{gh}(n_s)+f_{ss}+$(First parameter value)mod F)mod A, where u represents the index of the first sequence; $f_{gh}(n_s)$ represents the group hopping pattern; $f_{ss}$ represents the sequence shift pattern; mod represents a modulo operation; and A represents a first specified value, and F represents a second specified value.

In an embodiment, in determining an index of a first sequence based on a first parameter value corresponding to the first terminal device, the first terminal device determines the index of the first sequence based on the first parameter value and one or a plurality of specified values. Based on this solution, the first terminal device may determine the index of the first sequence based on the first parameter value corresponding to the first terminal device.

In an embodiment, the first parameter value, the one specified value, and the index of the first sequence satisfy the following second formula: u=(First parameter value)mod B, where u represents the index of the first sequence; mod represents a modulo operation; and B represents a third specified value.

In an embodiment, in determining an index of a first sequence based on a first parameter value corresponding to the first terminal device, the first terminal device determines the index of the first sequence based on the first parameter value, a cell identifier of the first cell, and one or a plurality of specified values. Based on this solution, the first terminal device may determine the index of the first sequence based on the first parameter value corresponding to the first terminal device.

In an embodiment, the first parameter value, the cell identifier of the first cell, the plurality of specified values, and the index of the first sequence satisfy the following third formula $u=(N_{ID}^{Ncell}$ mod C+First parameter value)mod D; or $u=(N_{ID}^{Ncell}$ mod C+(First parameter value)mod E)mod D, where u represents the index of the first sequence; $N_{ID}^{Ncell}$ represents the cell identifier of the first cell; mod represents a modulo operation; C represents a fourth specified value; D represents a fifth specified value; and E represents a sixth specified value.

In an embodiment, the one or plurality of specified values are all equal to a quantity of continuous slots occupied by one resource unit (RU).

In an embodiment, an initializing value $C_{init}$ of the second sequence is equal to the cell identifier of the first cell. Based on this solution, because cell identifiers of different cells are different, in a group hopping scenario, obtained group hopping patterns are different. This means that for these cells, hopping distances of indexes of first sequences in different RUs are different. In this way, even if indexes of first sequences that are used by the first RUs and that are of respective reference signals (for example, the reference signals may be DMRSs) of terminal devices of the different cells are the same, indexes of first sequences used on subsequent RUs are different. Further, the reference signals generated based on the first sequences indicated by the indexes of the first sequences are also different, so that interference between signals of the different cells can be avoided.

According to a second aspect, a method for receiving a reference signal is provided. The method is applicable to a wireless communications system. The wireless communications system includes a first cell. The first cell includes a plurality of terminal devices capable of transmitting uplink data on a same time-frequency resource. The plurality of terminal devices include a first terminal device. The method includes: A network device determines an index of a first sequence based on a first parameter value corresponding to the first terminal device, where the first parameter value is different from a parameter value corresponding to another terminal device in the plurality of terminal devices. The network device generates a first reference signal based on the first sequence indicated by the index of the first sequence. The network device receives a second reference signal from the first terminal device. The network device demodulates uplink data from the first terminal device based on the first reference signal and the second reference signal.

In an embodiment, before that a network device determines an index of a first sequence based on a first parameter value corresponding to the first terminal device, the network device determines, from a preset set, the first parameter value corresponding to the first terminal device, where the preset set includes parameter values that can be allocated to the plurality of terminal devices.

In an embodiment, before that a network device determines an index of a first sequence based on a first parameter value corresponding to the first terminal device, the network device determines the first parameter value corresponding to the first terminal device based on an identifier of the first terminal device.

In an embodiment, the network device sends a system message or higher layer signaling to the terminal device, where the system message or the higher layer signaling includes the first parameter value corresponding to the first terminal device.

In an embodiment, in determining an index of a first sequence based on a first parameter value corresponding to the first terminal device, the network device determines the index of the first sequence based on the first parameter value, a group hopping pattern, a sequence shift pattern, and one or a plurality of specified values, where the group hopping pattern is determined based on a second sequence, and the sequence shift pattern is determined based on a cell identifier of the first cell.

In an embodiment, the first parameter value, the group hopping pattern, the sequence shift pattern, the one or plurality of specified values, and the index of the first sequence satisfy the following first formula: $u=(f_{gh}(n_s)+f_{ss}+$ First parameter value)mod A; or $u=(f_{gh}(n_s)+f_{ss}+$(First parameter value)mod F)mod A, where u represents the index of the first sequence; $f_{gh}(n_s)$ represents the group hopping pattern; $f_{ss}$ represents the sequence shift pattern; mod represents a modulo operation; and A represents a first specified value, and F represents a second specified value.

In an embodiment, in determining an index of a first sequence based on a first parameter value corresponding to the first terminal device, the network device determines the index of the first sequence based on the first parameter value and one or a plurality of specified values.

In an embodiment, the first parameter value, the one specified value, and the index of the first sequence satisfy the following second formula: u=(First parameter value)mod B, where u represents the index of the first sequence; mod represents a modulo operation; and B represents a third specified value.

In an embodiment, in determining an index of a first sequence based on a first parameter value corresponding to the first terminal device, the network device determines the index of the first sequence based on the first parameter value, a cell identifier of the first cell, and one or a plurality of specified values.

In an embodiment, the first parameter value, the cell identifier of the first cell, the plurality of specified values, and the index of the first sequence satisfy the following third formula: $u=(N_{ID}^{Ncell}$ mod C+First parameter value)mod D; or $u=(N_{ID}^{Ncell}$ mod C+First parameter value)mod E)mod D, where u represents the index of the first sequence; $N_{ID}^{Ncell}$ represents the cell identifier of the first cell; mod represents a modulo operation; C represents a fourth specified value; D represents a fifth specified value; and E represents a sixth specified value.

In an embodiment, the one or plurality of specified values are all equal to a quantity of continuous slots occupied by one resource unit RU.

In an embodiment, an initializing value $C_{init}$ of the second sequence is equal to the cell identifier of the first cell.

For technical effects brought by any design manner in the second aspect, refer to technical effects brought by different design manners in the first aspect. Details are not described herein again.

According to a third aspect, a communications apparatus is provided, to implement the foregoing methods. The communications apparatus may be the first terminal device in the first aspect, or an apparatus including the first terminal device, or the communications apparatus may be the network device in the second aspect, or an apparatus including the network device. The communications apparatus includes a corresponding module, unit, or means for implementing the foregoing methods. The module, unit, or means may be implemented by hardware, software, or hardware executing corresponding software. The hardware or software includes one or more modules or units corresponding to the foregoing functions.

According to a fourth aspect, a communications apparatus is provided, including a processor and a memory, where the memory is configured to store computer instructions, and when the processor executes the instructions, the communications apparatus is enabled to perform the method in any one of the foregoing aspects. The communications apparatus may be the first terminal device in the first aspect, or an apparatus including the first terminal device, or the communications apparatus may be the network device in the second aspect, or an apparatus including the network device.

According to a fifth aspect, a communications apparatus is provided, including a processor, where the processor is configured to: be coupled to a memory, and perform, after reading instructions in the memory, the method according to any one of the foregoing aspects according to the instructions. The communications apparatus may be the first terminal device in the first aspect, or an apparatus including the first terminal device, or the communications apparatus may be the network device in the second aspect, or an apparatus including the network device.

According to a sixth aspect, a computer-readable storage medium is provided. The computer-readable storage medium stores instructions. When run on a computer, the instructions enable the computer to perform the method in any one of the foregoing aspects.

According to a seventh aspect, a computer program product including instructions is provided. When run on a computer, the computer program product enables the computer to perform the method in any one of the foregoing aspects.

According to an eighth aspect, a communications apparatus (for example, the communications apparatus may be a chip or a chip system) is provided. The communications apparatus includes a processor, configured to implement functions in any one of the foregoing aspects. In a possible design, the communications apparatus further includes a memory, and the memory is configured to store necessary program instructions and data. When the communications apparatus is a chip system, the chip system may include a chip, or include a chip and other discrete devices.

For technical effects brought by any design manner in the third aspect to the eighth aspect, refer to technical effects brought by different design manners in the first aspect or the second aspect. Details are not described herein again.

According to a ninth aspect, a communications system is provided. The communications system includes the terminal device in the foregoing aspects and the network device in the foregoing aspects.

DESCRIPTION OF EMBODIMENTS

Figure 1:
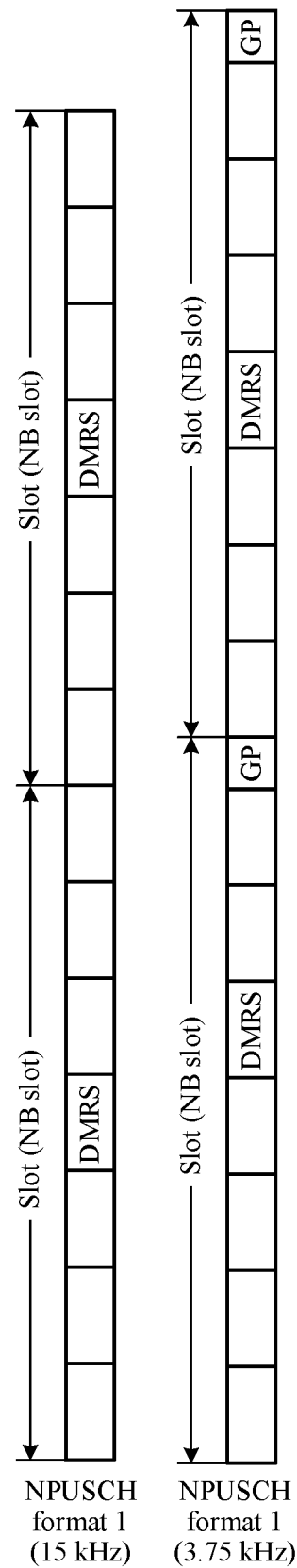
FIG. 1 is a schematic diagram of a location of a DMRS according to an embodiment of this application.

To facilitate understanding of the technical solutions in the embodiments of this application, the following first briefly describes related technologies or nouns of this application.

First, IoT:

IoT is referred to as the "Internet of Things connected". It extends a user end of the Internet to a location between objects, so that information exchange and communication can be performed between the objects. Such a communication mode is also referred to as machine type communication (MTC). A communication node is referred to as an MTC terminal or an MTC device. Typical IoT applications include various aspects such as a smart grid, intelligent agriculture, intelligent transportation, smart household, and environmental detection.

Because the Internet of Things needs to be applied in various scenarios, for example, from outdoors to indoors, and from aboveground to underground, many special requirements are put forward for the design of the Internet of Things. For example, an MTC terminal in some scenarios is applied in an environment with relatively poor coverage. For example, a water meter or an electric meter is usually mounted in a place with poor wireless network signals such as indoors or even a basement. Therefore, a coverage enhancement technology is required to resolve this problem. Alternatively, a quantity of MTC terminals in some scenarios is far greater than a quantity of devices for human-to-human communication, that is, large-scale deployment is required. Therefore, an MTC terminal needs to be obtained and used at very low costs. Alternatively, because a data packet transmitted by an MTC terminal in some scenarios is very small, and is insensitive to a delay, support for an MTC terminal with a low rate is required. Alternatively, in most cases, the MTC terminal is powered by using a battery. However, in many scenarios, it is required that the MTC terminal can be used for more than 10 years without battery replacement. This requires that the MTC terminal can work with extremely low power consumption.

To meet the foregoing requirements, the Mobile Communication Standardization Organization 3GPP adopted a new research project at the RAN #62 plenary meeting to study methods for supporting the Internet of Things with extremely low complexity and low costs in cellular networks. In addition, the research project was initiated as an NB-IoT project at the RAN #69 meeting.

Second, Uplink Data Transmission:

Different from long term evolution (LTE), NB-IoT uplink data transmission supports single-tone and multi-tone. A quantity of subcarriers corresponding to single-tone transmission is 1, which is mainly applicable to low-rate and coverage enhancement scenarios, thereby reducing implementation costs. If a quantity of subcarriers corresponding to multi-tone transmission is greater than 1, the multi-tone transmission may provide a higher rate than the single-tone transmission, and may also support coverage enhancement. In addition, there are two subcarrier spacings for the NB-IoT uplink transmission: 15 kHz and 3.75 kHz. When a quantity of subcarriers is 1 (single-tone), two subcarrier spacings: 15 kHz and 3.75 kHz are supported. When the quantity of subcarriers is greater than one (multi-tone), only the subcarrier spacing of 15 kHz is supported.

A basic scheduling unit of uplink data transmission is a resource unit (RU). When the subcarrier spacing is 3.75 kHz, an NB-IoT system supports only single-tone. One RU occupies one subcarrier in frequency domain and 16 slots (slot) in time domain. When the subcarrier spacing is 15 kHz, Table 1 defines the following RUs ($N_{sc}^{RU}$ represents a quantity of subcarriers occupied by one RU in frequency domain, and $N_{slots}^{UL}$ represents a quantity of continuous slots occupied by one RU in time domain), and each slot includes seven single-carrier frequency-division multiple access (SC-FDMA) symbols (symbol).

TABLE 1

| $N_{sc}^{RU}$ | $N_{slots}^{UL}$ |
|---|---|
| 1 | 16 |
| 3 | 8 |

TABLE 1-continued

| $N_{sc}^{RU}$ | $N_{slots}^{UL}$ |
|---|---|
| 6 | 4 |
| 12 | 2 |

In addition, the uplink data transmission may have repetition. If one data block occupies M RUs, and Repetition number=N, it indicates that the present uplink transmission occupies N*M RUs. Namely, repetition (repetition) is in the unit of M*RU.

Third, DMRS:

An NB-IoT narrow band physical uplink shared channel (NPUSCH) format 1 is used for uplink data transmission. In a process of the uplink data transmission, a terminal device sends a DMRS at the same time. The DMRS is used for channel estimation and channel equalization by a network device, to correctly demodulate uplink data. As shown in FIG. 1, when the uplink data transmission is performed, one SC-FDMA symbol in one slot is used for transmitting the DMRS, and remaining six SC-FDMA symbols are used for transmitting uplink data. For a guard period (GP) in FIG. 1, refer to existing related descriptions. Details are not described herein.

As described above, for the uplink data transmission, there are two transmission modes: single tone and multi tone. For single tone, there are two subcarrier spacings: 3.75 kHz and 15 kHz. For either subcarrier spacing, for single tone, one RU occupies 16 slots. In 3.75 kHz and 15 kHz of single tone, manners of generating the DMRS are the same, and only manners of mapping the DMRS are different. The embodiments of this application mainly relate to a manner of generating a DMRS, and how the DMRS is mapped during the uplink data transmission is not limited in the embodiments of this application.

For example, the DMRS may be generated with reference to the following formula (1) and formula (2):

$$\bar{r}_u(n) = \frac{1}{\sqrt{2}}(1+j)(1-2c(n))w(n \bmod 16), \quad \text{formula(1)}$$

$$0 \le n < M_{rep}^{NPUSCH} N_{slots}^{UL} N_{RU};$$

$$r_u(n) = \bar{r}_u(n); \quad \text{formula(2)}$$

c( ) represents a Gold (Gold) sequence, and in a conventional technology, c( ) is initialized at a starting location of NPUSCH transmission, and Initialization seed $C_{init}$=35; w( ) represents a Hadamard (Hadamard) sequence; $r_u(n)$ represents a DMRS sequence; $M_{rep}^{NPUSCH}$ represents a quantity of times of repetition of an NPUSCH; $N_{slots}^{UL}$ represents a quantity of continuous slots occupied by one RU, and for example, may be 16; $N_{RU}$ represents a quantity of RUs occupied by one data block, and mod( ) represents a modulo operation.

The following describes a method for generating the Gold sequence.

A manner of generating the Gold sequence c(n) is shown in the following formula (3):

$$c(n)=(x_1(n+N_C)+x_2(n+N_C)) \bmod 2; \quad \text{formula (3)}$$

A length of Gold is denoted as $M_{PN}$, namely, a value range of n is: 0, 1, . . . , $M_{PN}$−1. $x_1(n+N_C)$ and $x_2(n+N_C)$ are two sequences that generate c(n), $N_C$=1600, and mod( ) represents a modulo operation.

The foregoing sequence $x_1(n+N_C)$ may be determined by using the following formula (4):

$$x_1(n+31)=(x_1(n+3)+x_1(n))\bmod 2; \quad \text{formula (4)}$$

An initialization seed of the sequence $x_1(n+N_C)$ is $x_1(0)=1$, $x_1(n)=0$, $n=1, 2, \ldots 30$.

The foregoing sequence $x_2(n+N_C)$ may be determined by using the following formula (5):

$$x_2(n+31)=(x_2(n+3)+x_2(n+2)+x_2(n+1)+x_2(n))\bmod 2; \quad \text{formula (5)}$$

In an embodiment, a value of the initialization seed of the sequence $x_2(n+N_C)$ is related to specific application. During generation of the DMRS sequence, the initialization seed of the sequence $x_2(n+N_C)$ is 35. The sequence $x_2(n+N_C)$ may be obtained by using formulas $c_{init}=\Sigma_{i=0}^{30}x_2(i)\cdot 2^i$ and $C_{init}=35$.

The Hadamard sequence w( ) with a length of 16 is shown in the following Table 2:

TABLE 2

| u | w(0), ..., w(15) |
|---|---|
| 0 | 1 1 1 1 1 1 1 1 1 1 1 1 1 1 1 1 |
| 1 | 1 −1 1 −1 1 −1 1 −1 1 −1 1 −1 1 −1 1 −1 |
| 2 | 1 1 −1 −1 1 1 −1 −1 1 1 −1 −1 1 1 −1 −1 |
| 3 | 1 −1 −1 1 1 −1 −1 1 1 −1 −1 1 1 −1 −1 1 |
| 4 | 1 1 1 1 −1 −1 −1 −1 1 1 1 1 −1 −1 −1 −1 |
| 5 | 1 −1 1 −1 −1 1 −1 1 1 −1 1 −1 −1 1 −1 1 |
| 6 | 1 1 −1 −1 −1 −1 1 1 1 1 −1 −1 −1 −1 1 1 |
| 7 | 1 −1 −1 1 −1 1 1 −1 1 −1 −1 1 −1 1 1 −1 |
| 8 | 1 1 1 1 1 1 1 1 −1 −1 −1 −1 −1 −1 −1 −1 |
| 9 | 1 −1 1 −1 1 −1 1 −1 −1 1 −1 1 −1 1 −1 1 |
| 10 | 1 1 −1 −1 1 1 −1 −1 −1 −1 1 1 −1 −1 1 1 |
| 11 | 1 −1 −1 1 1 −1 −1 1 −1 1 1 −1 −1 1 1 −1 |
| 12 | 1 1 1 1 −1 −1 −1 −1 −1 −1 −1 −1 1 1 1 1 |
| 13 | 1 −1 1 −1 −1 1 −1 1 −1 1 −1 1 1 −1 1 −1 |
| 14 | 1 1 −1 −1 −1 −1 1 1 −1 −1 1 1 1 1 −1 −1 |
| 15 | 1 −1 −1 1 −1 1 1 −1 −1 1 1 −1 1 −1 −1 1 | u in Table 2 is an index of the Hadamard sequence w( ). In the conventional technology, a calculation formula of the index u of the Hadamard sequence w( ) in a hopping scenario is different from a calculation formula of the index u of the Hadamard sequence w( ) in a non-group hopping scenario.

The calculation formula of the index u of the Hadamard sequence w( ) in the non-group hopping scenario is shown in the following formula (6):

$$u=N_{ID}^{Ncell} \bmod 16; \quad \text{formula (6)}$$

$N_{ID}^{Ncell}$ represents a cell identifier; and mod( ) represents a modulo operation.

Based on the foregoing formula (6), for example, using an example in which one data block occupies two RUs, the NPUSCH is repeated twice, and there are a total of four RUs, a mapping relationship between cell identifiers and indexes u of Hadamard sequences used by RUs may be shown in the following Table 3. It can be learned from Table 3 that, in this case, the indexes u of the Hadamard sequences used on the RUs are the same, and the indexes u of the Hadamard sequences used in intra-frequency cells, for example, a number 0 cell and a number 16 cell are completely the same.

TABLE 3

| Cell identifiers | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 0 | 0 | 0 | 0 | 0 |
| 1 | 1 | 1 | 1 | 1 |
| 2 | 2 | 2 | 2 | 2 |
| ... | ... | ... | ... | ... |
| 13 | 13 | 13 | 13 | 13 |
| 14 | 14 | 14 | 14 | 14 |
| 15 | 15 | 15 | 15 | 15 |
| 16 | 16 | 16 | 16 | 16 |
| 17 | 17 | 17 | 17 | 17 |
| ... | ... | ... | ... | ... |

The calculation formula of the index u of the Hadamard sequence w( ) in the group hopping scenario is shown in the following formula (7):

$$u=(f_{gh}(n_s)+f_{ss})\bmod N_{seq}^{RU}; \quad \text{formula (7)}$$

$f_{gh}(n_s)$ represents a group hopping pattern (pattern); $f_{ss}$ represents a sequence shift pattern; mod represents a modulo operation; and $N_{seq}^{RU}$ represents a length of one RU, for example, may be 16.

A calculation formula of $f_{gh}(n_s)$ may be shown in the following formula (8):

$$f_{gh}(n_s)=(\Sigma_{i=0}^{7}c(8n'_s+i)\cdot 2^i)\bmod N_{seq}^{RU}; \quad \text{formula (8))}$$

c( ) represents a Gold sequence, and in the conventional technology, c( ) is initialized at a starting location of each RU, and an initialization seed is $$C_{init} = \left\lfloor \frac{N_{ID}^{Ncell}}{N_{seq}^{RU}} \right\rfloor;$$

$\lfloor \ \rfloor$ represents rounding down, $N_{ID}^{Ncell}$ represents a cell identifier, $N_{seq}^{RU}$ represents a length of one RU, and for example, may be 16; $n'_s$ is a number of the first slot of each RU for single tone; mod represents a modulo operation; and $N_{seq}^{RU}$ represents a length of one RU, and for example, may be 16.

A calculation formula of $f_{ss}$ may be shown in the following formula (9):

$$f_{ss}=(N_{ID}^{Ncell}+\Delta_{ss}) \bmod N_{seq}^{RU};\qquad \text{formula (9)}$$

$N_{ID}^{Ncell}$ represents a cell identifier; mod( ) represents a modulo operation; $N_{seq}^{RU}$ represents a length of one RU, and for example, may be 16; and $\Delta_{ss} \in \{0,1,\ldots,29\}$ is a parameter configured by higher layer. If this parameter is not configured, a value is 0 by default.

Based on the foregoing formula (7) to formula (9), for example, using an example in which one data block occupies two RUs, the NPUSCH is repeated twice, and there are a total of four RUs, in this case, the index u of the Hadamard sequence may be determined by using $f_{gh}(n_s)$ and $f_{ss}$. The mapping relationship between the cell identifiers and the indexes u of the Hadamard sequences used by the RUs may be shown in the following Table 4. It can be learned from Table 4 that, in this case, the indexes u of the Hadamard sequences used on the RUs are different, and the indexes u of the Hadamard sequences used in intra-frequency cells, for example, a number 0 cell and a number 16 cell are also different.

TABLE 4

| Cell identifiers | Index u of a Hadamard sequence used by an RU 1 | Index u of a Hadamard sequence used by an RU 2 | Index u of a Hadamard sequence used by an RU 3 | Index u of a Hadamard sequence used by an RU 4 |
|---|---|---|---|---|
| 0 | 1 | 5 | 7 | 9 |
| 1 | 2 | 6 | 8 | 10 |
| 2 | 3 | 7 | 9 | 11 |
| ... | ... | ... | ... | ... |
| 13 | 14 | 2 | 4 | 6 |
| 14 | 15 | 3 | 5 | 7 |
| 15 | 0 | 4 | 6 | 8 |
| 16 | 2 | 9 | 3 | 5 |
| 17 | 3 | 10 | 4 | 6 |
| ... | ... | ... | ... | ... |

It should be noted that, values of the indexes u of the Hadamard sequences in Table 4 are merely examples. Description is provided by using an example in which when $C_{init}=0$, $f_{gh}(n_s)=1, 5, 7, 9$; and when $C_{init}=1$, $f_{gh}(n_s)=2, 9, 3, 5$. When $f_{gh}(n_s)$ is another value, the values of the indexes u of the Hadamard sequences may be different from those in Table 4. This is not limited in the embodiments of this application.

On one hand, in the conventional technology, in the group hopping scenario and the non-group hopping scenario, in formula (1), c( ) is initialized at the starting location of NPUSCH transmission, and the initialization seed $C_{init}=35$. Therefore, if different terminal devices of a same cell start to transmit uplink data at a same time-frequency location on the shared resource, either in the group hopping scenario or the non-group hopping scenario, the Gold sequences start to be initialized at the same time-frequency location, and initialization seeds of the Gold sequences are the same, and correspond to same Gold sequences.

On the other hand, either in the group hopping scenario or the non-group hopping scenario, different terminal devices of a same cell corresponding to a same cell identifier. Therefore, based on formula (6) or formula (7) to formula (9), it can be learned that, when the different terminal devices of the same cell transmit uplink data on the shared resource, the different terminal devices of the same cell correspond to same indexes of the Hadamard sequences w( ). Further, the different terminal devices of the same cell correspond to same Hadamard sequences.

Based on the above, it can be learned with reference to formula (1) and formula (2) that, either in the group hopping scenario or the non-group hopping scenario, when different terminal devices of a same cell transmit uplink data on the shared resource, based on the existing method for generating a DMRS, the different terminal devices of the same cell generate same DMRSs.

Certainly, for terminal devices of different cells, group hopping more facilitates randomizing inter-cell interference. For example, in the group hopping scenario, because the indexes u of the Hadamard sequences used in the number 0 cell and the number 16 cell are different, the used Hadamard sequences are different. Further, used DMRS sequences are different, which more facilitates randomizing inter-cell interference.

The following describes the technical solutions in the embodiments of this application with reference to the accompanying drawings in the embodiments of this application. In the description of this application, unless otherwise specified, "/" indicates that associated objects are in an "or" relationship. For example, A/B may indicate A or B. "And/or" in this application is merely an association relationship for describing associated objects, and indicates that there may be three relationships. For example, A and/or B may indicate that only A exists, both A and B exist, and only B exists. A and B each may be singular or plural. In addition, in the description of this application, "a plurality of" means two or more than two unless otherwise specified. "At least one of the following items" or a similar expression thereof refers to any combination in these items, including any combination of a single item or a plurality of items. For example, at least one of a, b, and c may represent a, b, c, a-b, a-c, b-c, or a-b-c, where a, b, and c may be singular or plural. In addition, for ease of clearly describing the technical solutions in the embodiments of this application, in the embodiments of this application, words such as "first" and "second" are used to distinguish same items or similar items whose functions and roles are basically the same. A person skilled in the art may understand that words such as "first" and "second" do not limit a quantity and an execution order, and words such as "first" and "second" do not limit a definite difference. In addition, in the embodiments of this application, the word such as "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Specifically, use of the word such as "exemplary" or "for example" is intended to present related concepts in a specific manner for ease of understanding.

The embodiments of this application are applicable to an LTE system, for example, an NB-IoT system, and may also be applicable to other wireless communications systems, for example, a global system for mobile communications (GSM), a mobile communications system (UMTS), a code division multiple access (CDMA) system, a wideband code division multiple access (WCDMA) system, a future-oriented new network device system, and the like. This is not limited in the embodiments of this application. The foregoing communications systems to which this application is applicable are merely examples for description. The communications systems to which this application is applicable are not limited thereto. This is all described herein. Details are not described again in the following. In addition, the terms "system" and "network" can be interchanged with each other.

Figure 2:
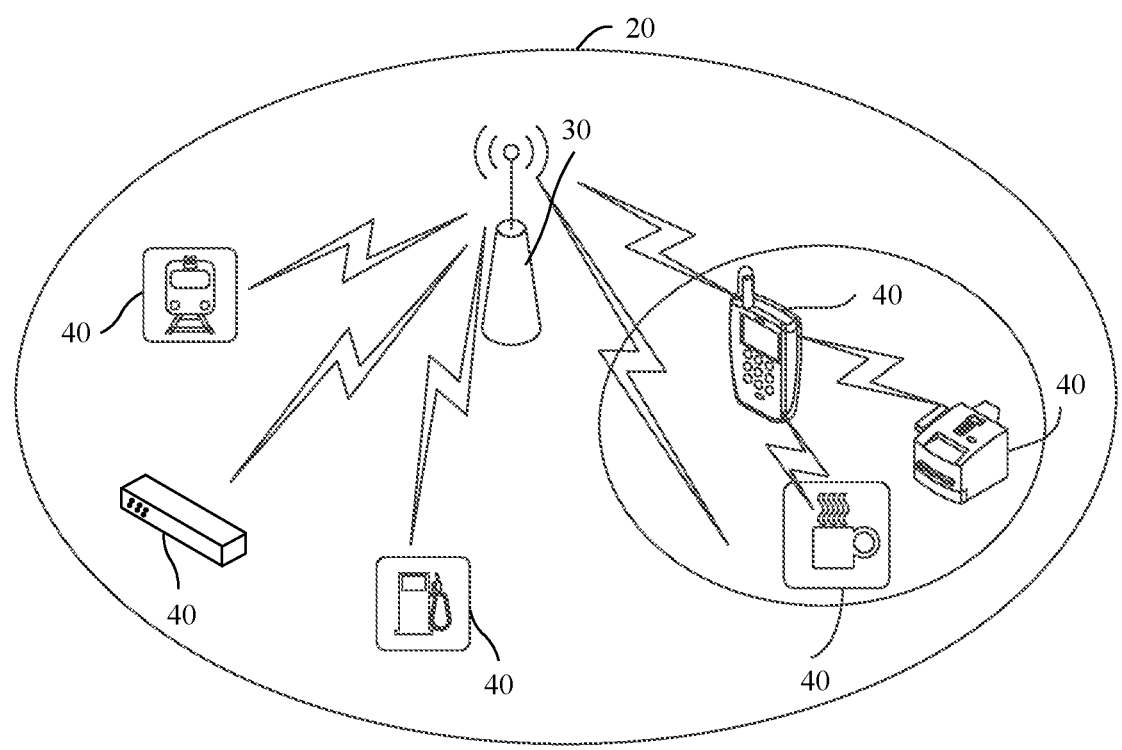
FIG. 2 is a schematic structural diagram of a communications system according to an embodiment of this application.

FIG. 2 shows a communications system 20 according to an embodiment of this application. The communications system 20 includes a network device 30 and a plurality of terminal devices 40 in a first cell covered by the network device 30. The plurality of terminal devices 40 can transmit uplink data on a same time-frequency resource. In an embodiment, different terminal devices in the plurality of terminal devices 40 may communicate with each other. The first cell may be any one of one or more cells covered by the network device 30.

Using an example in which the plurality of terminal devices 40 include a first terminal device, and the first terminal device is any terminal device in the plurality of terminal devices 40, in this embodiment of this application, the first terminal device determines an index of a first sequence based on a first parameter value corresponding to the first terminal device, where the first parameter value is different from a parameter value corresponding to another terminal device in the plurality of terminal devices 40. The first terminal device generates a first reference signal based on the first sequence indicated by the index of the first sequence, and then sends the first reference signal to the network device 30. Further, the network device 30 receives a second reference signal from the first terminal device, determines the index of the first sequence based on the first parameter value corresponding to the first terminal device, and generates the first reference signal based on the first sequence indicated by the index of the first sequence. Then, the network device 30 demodulates uplink data from the first terminal device based on the first reference signal and the second reference signal. Specific implementation of the solution is described in detail in the subsequent method embodiments. Details are not described herein. Based on this solution, because the plurality of terminal devices that can transmit the uplink data on the same time-frequency resource and that are of the same cell determine indexes of first sequences by using different parameter values, the determined indexes of the first sequences may be different. Further, reference signals generated based on the first sequences indicated by the indexes of the first sequences may also be different. Further, the different terminal devices of the same cell may transmit the uplink data on the same time-frequency resource by using, to the greatest extent, different reference signals, so that the network device can distinguish, to the greatest extent, the reference signals used by the different terminal devices, thereby correctly demodulating the uplink data of the different terminal devices.

In an embodiment, the network device 30 is a device that connects the terminal device 40 to a wireless network, and may be an evolved NodeB (eNB, or eNodeB) in long term evolution (LTE), or a base transceiver station (BTS) in GSM or CDMA; or a NodeB in a WCDMA system; or a base station in a 5th generation (5G) network or a future evolved public land mobile network (PLMN), a broadband network gateway (BNG), an aggregation switch or a non-3GPP access device, or the like. This is not limited in this embodiment of this application. In an embodiment, the base station may include base stations in various forms, for example, a macro base station, a micro base station (also referred to as a small cell), a relay station, or an access point. This is not limited in this embodiment of this application.

In an embodiment, the terminal device 40 may be a device configured to implement a wireless communication function, for example, a terminal, or a chip that may be used in the terminal. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, or another processing device connected to a wireless modem, a vehicle-mounted device or a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or fixed.

In an embodiment, the network device 30 and the terminal device 40 may also be referred to as a communications apparatus, which may be a general-purpose device or a dedicated device. This is not limited in this embodiment of this application.

Figure 3:
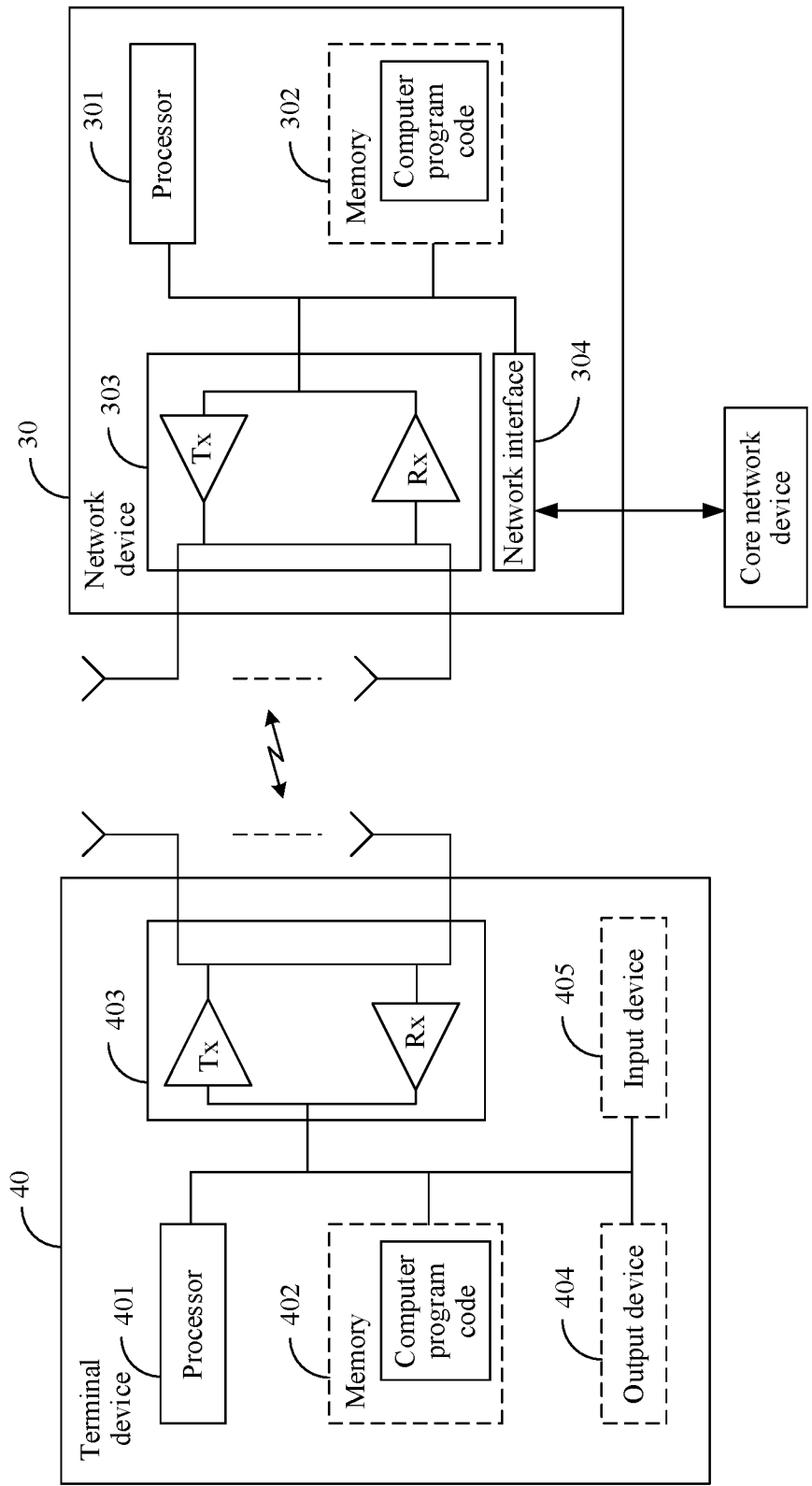
FIG. 3 is a schematic structural diagram of a terminal device and a network device according to an embodiment of this application.

Optionally, FIG. 3 is a schematic structural diagram of a network device 30 and a terminal device 40 according to an embodiment of this application.

The terminal device 40 includes at least one processor (in FIG. 3, an example in which one processor 401 is included is used for description) and at least one transceiver (in FIG. 3, an example in which one transceiver 403 is included is used for description). In an embodiment, the terminal device 40 may further include at least one memory (in FIG. 3, an example in which one memory 402 is included is used for description), at least one output device (in FIG. 3, an example in which one output device 404 is included is used for description), and at least one input device (in FIG. 3, an example in which one input device 405 is included is used for description).

The processor 401, the memory 402, and the transceiver 403 are connected by using a communications line. The communications line may include a path for transmitting information between the foregoing components.

The processor 401 may be a general-purpose central processing unit (CPU), a microprocessor, an application-specific integrated circuit (ASIC), or one or more integrated circuits configured to control program execution of solutions of this application. During specific implementation, in an embodiment, the processor 401 may alternatively include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory 402 may be a read-only memory (ROM) or another type of static storage device that may store static information and instructions, a random access memory (RAM), or another type of dynamic storage device that may store information and instructions, or may be an electrically erasable programmable read-only memory (EEPROM), a compact disc read-only memory (CD-ROM), or other optical disk storage, optical disc storage (including a compact disc, a laser disc, an optical disc, a digital versatile disc, a Blu-ray disc, and the like), a disk storage medium or another magnetic storage device, or any other medium that can be used for carrying or storing expected program code in a form of instructions or a data structure and that can be accessed by a computer, but is not limited thereto. The memory 402 may exist independently, and is connected to the processor 401 by using the communications line. The memory 402 may alternatively be integrated with the processor 401.

The memory 402 is configured to store computer-executable instructions for executing the solutions of this application, and the processor 401 controls the execution. Specifically, the processor 401 is configured to execute the computer-executable instructions stored in the memory 402, to implement the method for sending a reference signal in the embodiments of this application.

Alternatively, optionally, in an embodiment of this application, the processor 401 may perform a processing-related function in the method for sending a reference signal provided in the following embodiments of this application, and the transceiver 403 is responsible for communicating with another device or a communications network. This is not limited in this embodiment of this application.

Optionally, the computer-executable instruction in this embodiment of this application may also be referred to as application code or computer program code. This is not limited in this embodiment of this application.

The transceiver 403 may use any apparatus of a transceiver type, and is configured to communicate with another device or a communications network, for example, an Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (in FIG. 3, an example in which one processor 301 is included is used for description), at least one transceiver (in FIG. 3, an example in which one transceiver 303 is included is used for description), and at least one network interface (in FIG. 3, an example in which one network interface 304 is included is used for description). In an embodiment, the network device 30 may further include at least one memory (in FIG. 3, an example in which one memory 302 is included is used for description). The processor 301, the memory 302, the transceiver 303, and the network interface 304 are connected by using a communications line. The network interface 304 is configured to connect to a core network device by using a link (for example, an S1 interface), or connect to a network interface (not shown in FIG. 3) of another network device by using a wired or wireless link (for example, an X2 interface). This is not limited in this embodiment of this application. In addition, for related descriptions of the processor 301, the memory 302, and the transceiver 303, refer to descriptions of the processor 401, the memory 402, and the transceiver 403 in the terminal device 40. Details are not described herein again.

Figure 4:
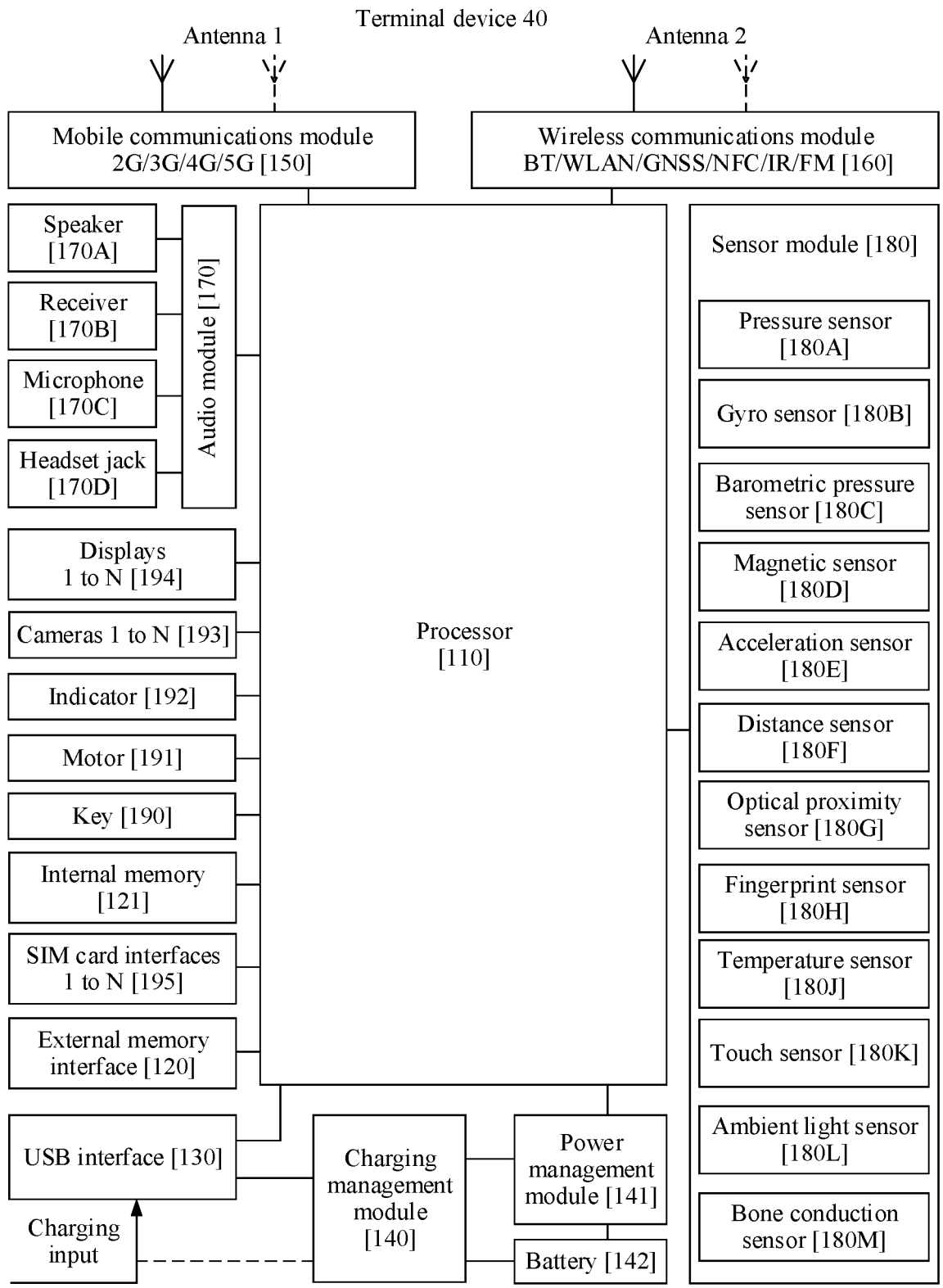
FIG. 4 is another schematic structural diagram of a terminal device according to an embodiment of this application.

With reference to the schematic structural diagram of the terminal device 40 shown in FIG. 3, for example, FIG. 4 is a structural form of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communications module 150, a wireless communications module 160, and the like in FIG. 4.

The antenna 1 and the antenna 2 are configured to transmit and receive electromagnetic wave signals. Each antenna in the terminal device 40 may be configured to cover one or more communication bands. Different antennas may also be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution applied to the terminal device 40 for wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a solution applied to the terminal device 40 for wireless communication including wireless local area network (WLAN) (for example, a Wi-Fi network), Bluetooth (BT), global navigation satellite system (GNSS), frequency modulation (FM), near field communication (NFC), and infrared (IR) technologies. The wireless communications module 160 may be one or more devices integrating at least one communication processing module. The wireless communications module 160 receives an electromagnetic wave by using the antenna 2, performs frequency modulation and filtering on the electromagnetic wave signal, and sends a processed signal to the processor 110. The wireless communications module 160 may further receive a to-be-sent signal from the processor 110, perform frequency modulation and amplification on the to-be-sent signal, and convert the signal into an electromagnetic wave by using the antenna 2 for radiation. When the terminal device 40 is a first device, the wireless communications module 160 may provide a solution applied to the terminal device 40 for NFC wireless communication. This means that the first device includes an NFC chip. The NFC chip can improve an NFC wireless communication function. When the terminal device 40 is a second device, the wireless communications module 160 may provide a solution applied to the terminal device 40 for NFC wireless communication. This means that the first device includes an electronic label (for example, a radio frequency identification (RFID) label). An NFC chip of another device may perform NFC wireless communication with the second device when getting close to the electronic label.

In some embodiments, in the terminal device 40, the antenna 1 is coupled to the mobile communications module 150, and the antenna 2 is coupled to the wireless communications module 160, so that the terminal device 40 can communicate with a network and another device by using a wireless communications technology. The wireless communications technology may include a global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, or IR technology. The GNSS may include a global positioning system (GPS), a global navigation satellite system (GLO-NASS), a BeiDou navigation satellite system (BDS), a quasi-zenith satellite system (QZSS), or a satellite based augmentation system (SBAS).

In some embodiments, a function of the memory 402 in FIG. 3 may be implemented by using an internal memory 121 or an external memory (for example, a micro SD card) connected to an external memory interface 120 in FIG. 4.

In some embodiments, a function of the output device 404 in FIG. 3 may be implemented by using a display 194 in FIG. 4. The display 194 is configured to display an image, a video, and the like. The display 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180, for example, may include one or more of a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not limited in this embodiment of this application.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (also referred to as a "horn"), a receiver 170B (also referred to as a "handset"), a microphone 170C (also referred to as a "microphone" or "microphone"), a headset jack 170D, or the like. This is not limited in this embodiment of this application.

It may be understood that a structure shown in FIG. 4 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by using hardware, software, or a combination of software and hardware.

With reference to FIG. 2 to FIG. 4, the following describes a method for receiving and sending a reference signal provided in the embodiments of this application by using an example in which the first terminal device in the plurality of terminal devices 40 interacts with the network device shown in FIG. 2.

It should be noted that, a name of a message between network elements, a name of each parameter in a message, or the like in the following embodiments of this application is merely an example, and may alternatively be another name during specific implementation. This is not limited in the embodiments of this application.

Figure 5:
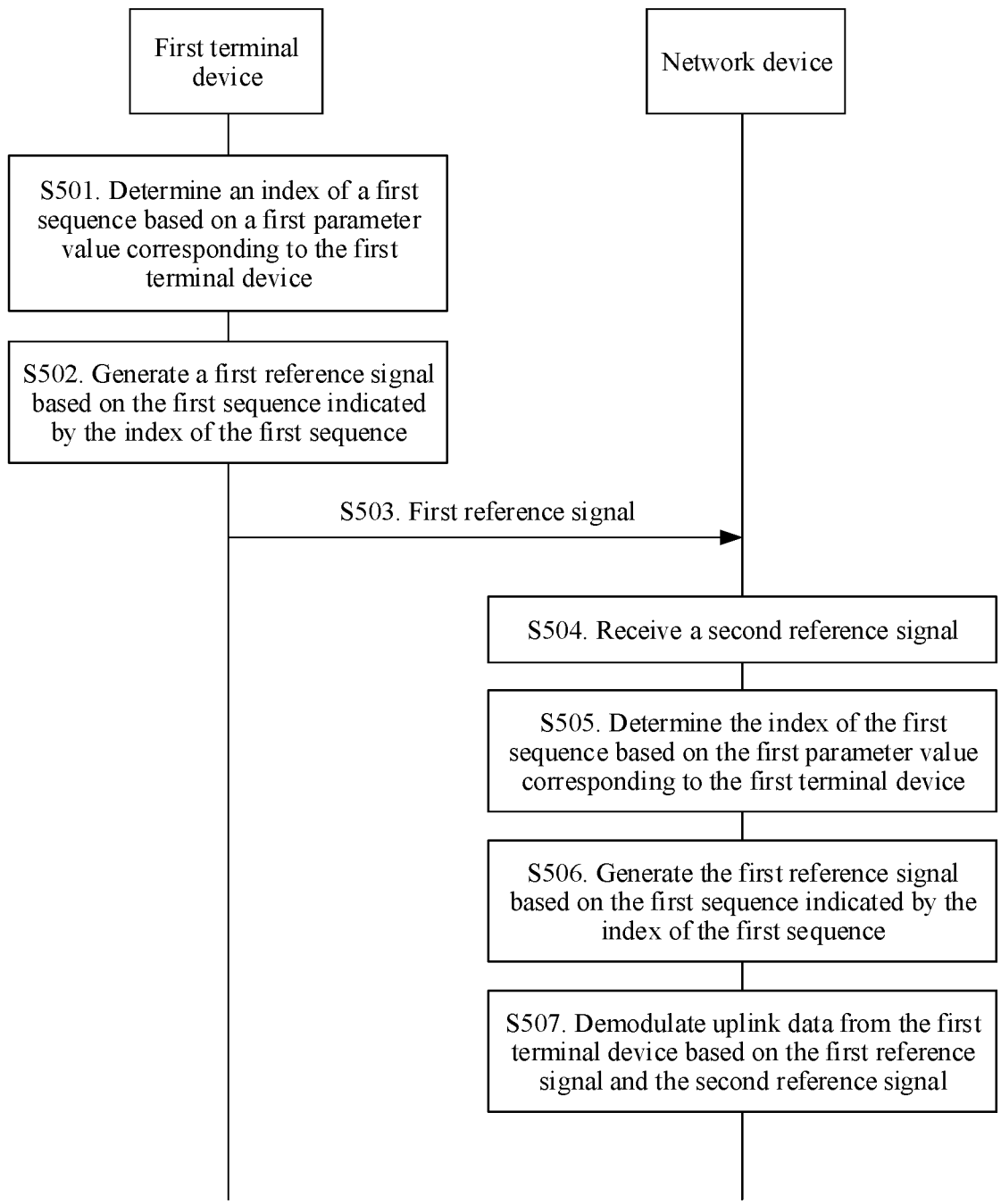
FIG. 5 shows a method for receiving and sending a reference signal according to an embodiment of this application.

FIG. 5 shows a method for receiving and sending a reference signal according to an embodiment of this application. The method for receiving and sending a reference signal includes the following operations.

S501. A first terminal device determines an index of a first sequence based on a first parameter value corresponding to the first terminal device, where the first parameter value is different from a parameter value corresponding to another terminal device in a plurality of terminal devices.

For example, the first sequence in this embodiment of this application, for example, may be a Hadamard sequence.

In an embodiment, a network device may configure a parameter value set. The parameter value set includes a plurality of different parameter values, for allocation to different terminal devices. The plurality of parameter values includes the first parameter value for allocation to the first terminal device. When communicating with the first terminal device, the network device adds the first parameter value corresponding to the first terminal device to a system message or higher layer signaling to be sent by the network device to the first terminal device. In other words, the first terminal device receives the system message or higher layer signaling from the network device, where the system message or higher layer signaling includes the first parameter value corresponding to the first terminal. Further, the first terminal device may determine the index of the first sequence based on the first parameter value corresponding to the first terminal device.

For example, the first parameter value may be carried in a master information block (MIB) or a system information block (SIB) of the system message.

For example, the higher layer signaling in this embodiment of this application, for example, may be dedicated radio resource control (RRC) signaling.

Certainly, in an embodiment of this application, the first parameter value may alternatively be carried by using other signaling than the system message and the higher layer signaling. This is not limited in this embodiment of this application.

In another embodiment, the first terminal device may determine the first parameter value corresponding to the first terminal device based on an identifier of the first terminal device. For example, First parameter value=Identifier of the first terminal device; or First parameter value=(Identifier of the first terminal device)mod(Specified value 1); or First parameter value=(Identifier of the first terminal device)/(Specified value 2). The specified value 1 or the specified value 2 herein, for example, may be a quantity of continuous slots occupied by one RU, for example, 16. Further, the first terminal device may determine the index of the first sequence based on the first parameter value corresponding to the first terminal device.

Optionally, in an embodiment of this application, the identifier of the first terminal device, for example, may be a user equipment identity (UEID), or an international mobile subscriber identification number (IMSI). This is not limited in this embodiment of this application.

In a non-group hopping scenario:

In an embodiment, that a first terminal device determines an index of a first sequence based on a first parameter value corresponding to the first terminal device may include:

the first terminal device determines the index of the first sequence based on the first parameter value corresponding to the first terminal device, a cell identifier of a first cell in which the first terminal device is located, and one or a plurality of specified values.

For example, the first parameter value, the cell identifier of the first cell, the plurality of specified values, and the index of the first sequence satisfy the following formula (10) or formula (11):

$$u=(N_{ID}^{Ncell} \bmod C + \text{First parameter value}) \bmod D; \quad \text{formula (10)}$$

or $$u=(N_{ID}^{Ncell} \bmod C + (\text{First parameter value}) \bmod E) \bmod D; \quad \text{formula (11)}$$

u represents the index of the first sequence; $N_{ID}^{Ncell}$ represents the cell identifier of the first cell; mod represents a modulo operation; C represents a fourth specified value; D represents a fifth specified value; and E represents a sixth specified value.

In an embodiment, each of the fourth specified value, the fifth specified value, and the sixth specified value herein may be equal to a quantity of continuous slots occupied by one RU, for example, 16.

Based on the foregoing formula (10) or formula (11), it is assumed that each of the fourth specified value, the fifth specified value, and the sixth specified value may be equal to 16. For example, using an example in which one data block occupies two RUs, an NPUSCH is repeated twice, there are a total of four RUs, the first cell includes the first terminal device (it is assumed that an identifier of the first terminal device is an identifier 1), a second terminal device (it is assumed that an identifier of the second terminal device is an identifier 2), and a third terminal device (it is assumed that an identifier of the third terminal device is an identifier 3) that can transmit uplink data on a same time-frequency resource, the first parameter value corresponding to the first terminal device is 0, a second parameter value corresponding to the second terminal device is 1, and a third parameter value corresponding to the third terminal device is 2, a mapping relationship between the cell identifiers, the parameter values corresponding to the terminal devices, and indexes u of first sequences used by the RUs may be shown in Table 5. It can be learned from Table 5 that, in this case, indexes u of first sequences used by different terminal devices of a same cell on a same RU are different.

Alternatively, in another embodiment, that a first terminal device determines an index of a first sequence based on a first parameter value corresponding to the first terminal device may include:

the first terminal device determines the index of the first sequence based on the first parameter value and one or a plurality of specified values.

For example, the first parameter value, the one specified value, and the index of the first sequence satisfy the following formula (12):

$$u=(\text{First parameter value}) \bmod B; \quad \text{formula (12)}$$

u represents the index of the first sequence; mod represents a modulo operation; and B represents a third specified value.

In an embodiment, the third specified value herein may be equal to a quantity of continuous slots occupied by one RU, for example, 16.

Based on the foregoing formula (12), it is assumed that the third specified value may be equal to 16. For example, using an example in which one data block occupies two RUs, an NPUSCH is repeated twice, there are a total of four RUs, the first cell includes the first terminal device (it is assumed that an identifier of the first terminal device is an identifier 1), a second terminal device (it is assumed that an identifier of the second terminal device is an identifier 2), and a third terminal device (it is assumed that an identifier of the third terminal device is an identifier 3) that can transmit uplink data on a same time-frequency resource, the first parameter value corresponding to the first terminal device is 0, a second parameter value corresponding to the second terminal device is 1, and a third parameter value corresponding to the third terminal device is 2, a mapping relationship between the cell identifiers, the parameter values corresponding to the terminal devices, and indexes u of first sequences used by the RUs may be shown in Table 6. It can be learned from Table 6 that, in this case, indexes u of first sequences used by different terminal devices of a same cell on a same RU are different.

TABLE 5

| Cell identifiers | Parameter values | Identifiers of terminal devices | Index of a first sequence used by an RU 1 | Index of a first sequence used by an RU 2 | Index of a first sequence used by an RU 3 | Index of a first sequence used by an RU 4 |
|---|---|---|---|---|---|---|
| 0 | 0 | Identifier 1 | 0 | 0 | 0 | 0 |
|   | 1 | Identifier 2 | 1 | 1 | 1 | 1 |
|   | 2 | Identifier 3 | 2 | 2 | 2 | 2 |
| 1 | 0 | Identifier 1 | 1 | 1 | 1 | 1 |
|   | 1 | Identifier 2 | 2 | 2 | 2 | 2 |
|   | 2 | Identifier 3 | 3 | 3 | 3 | 3 |
| 2 | 0 | Identifier 1 | 2 | 2 | 2 | 2 |
|   | 1 | Identifier 2 | 3 | 3 | 3 | 3 |
|   | 2 | Identifier 3 | 4 | 4 | 4 | 4 |
| ... | ... | ... | ... | ... | ... | ... |

TABLE 6

| Cell identifiers | Parameter values | Identifiers of terminal devices | Index of a first sequence used by an RU 1 | Index of a first sequence used by an RU 2 | Index of a first sequence used by an RU 3 | Index of a first sequence used by an RU 4 |
|---|---|---|---|---|---|---|
| 0 | 0 | Identifier 1 | 0 | 0 | 0 | 0 |
|   | 1 | Identifier 2 | 1 | 1 | 1 | 1 |
|   | 2 | Identifier 3 | 2 | 2 | 2 | 2 |
| 1 | 0 | Identifier 1 | 0 | 0 | 0 | 0 |
|   | 1 | Identifier 2 | 1 | 1 | 1 | 1 |
|   | 2 | Identifier 3 | 2 | 2 | 2 | 2 |
| 2 | 0 | Identifier 1 | 0 | 0 | 0 | 0 |
|   | 1 | Identifier 2 | 1 | 1 | 1 | 1 |
|   | 2 | Identifier 3 | 2 | 2 | 2 | 2 |
| ... | ... | ... | ... | ... | ... | ... |

In a group hopping scenario:

In an embodiment, that a first terminal device determines an index of a first sequence based on a first parameter value corresponding to the first terminal device may include:

the first terminal device determines the index of the first sequence based on the first parameter value, a group hopping pattern, a sequence shift pattern, and one or a plurality of specified values, where the group hopping pattern is determined based on a second sequence, and the sequence shift pattern is determined based on a cell identifier of the first cell.

For example, the second sequence in this embodiment of this application, for example, may be a Gold sequence.

For example, the first parameter value, the group hopping pattern, the sequence shift pattern, the one or plurality of specified values, and the index of the first sequence satisfy the following formula (13) or formula (14):

$$u = (f_{gh}(n_s) + f_{ss} + \text{First parameter value}) \bmod A; \quad \text{formula (13)}$$

or $$u = (f_{gh}(n_s) + f_{ss} + (\text{First parameter value}) \bmod F) \bmod A; \quad \text{formula (14)}$$

$u$ represents the index of the first sequence; $f_{gh}(n_s)$ represents the group hopping pattern; $f_{ss}$ represents the sequence shift pattern; mod represents a modulo operation; and A represents a first specified value, and F represents a second specified value.

In an embodiment, the first specified value or the second specified value herein may be equal to a quantity of continuous slots occupied by one RU, for example, 16.

For a calculation formula of $f_{ss}$, refer to the foregoing formula (9). Details are not described herein.

For a calculation formula of $f_{gh}(n_s)$, refer to the foregoing formula (8). Details are not described herein.

Based on the foregoing formula (13) or formula (14), it is assumed that each of the first specified value and the second specified value may be equal to 16. For example, using an example in which one data block occupies two RUs, an NPUSCH is repeated twice, there are a total of four RUs, the first cell includes the first terminal device (it is assumed that an identifier of the first terminal device is an identifier 1), a second terminal device (it is assumed that an identifier of the second terminal device is an identifier 2), and a third terminal device (it is assumed that an identifier of the third terminal device is an identifier 3) that can transmit uplink data on a same time-frequency resource, the first parameter value corresponding to the first terminal device is 0, a second parameter value corresponding to the second terminal device is 1, and a third parameter value corresponding to the third terminal device is 2, a mapping relationship between the cell identifiers, the parameter values corresponding to the terminal devices, and indexes u of first sequences used by the RUs may be shown in Table 7. It can be learned from Table 7 that, indexes u of first sequences used by different terminal devices of a same cell on a same RU are different.

TABLE 7

| Cell identifiers | Parameter values | Identifiers of terminal devices | Index of a first sequence used by an RU 1 | Index of a first sequence used by an RU 2 | Index of a first sequence used by an RU 3 | Index of a first sequence used by an RU 4 |
|---|---|---|---|---|---|---|
| 0 | 0 | Identifier 1 | 1 | 5 | 7 | 9 |
|   | 1 | Identifier 2 | 2 | 6 | 8 | 10 |
|   | 2 | Identifier 3 | 3 | 7 | 9 | 11 |
| 1 | 0 | Identifier 1 | 2 | 6 | 8 | 10 |
|   | 1 | Identifier 2 | 3 | 7 | 9 | 11 |
|   | 2 | Identifier 3 | 4 | 8 | 10 | 12 |
| 2 | 0 | Identifier 1 | 3 | 7 | 9 | 11 |
|   | 1 | Identifier 2 | 4 | 8 | 10 | 12 |
|   | 2 | Identifier 3 | 5 | 9 | 11 | 13 |
| ... | ... | ... | ... | ... | ... | ... |

It should be noted that, values of the indexes u of the first sequences in Table 7 are merely examples. Description is provided by using an example in which when $C_{init}=0$, $f_{gh}(n_s)=1, 5, 7, 9$. When $f_{gh}(n_s)$ is another value, the values of the indexes u of the first sequences may be different from those in Table 7. This is not limited in this embodiment of this application.

Based on the above, based on the solution provided in this embodiment of this application, in either a group hopping scenario or a non-group hopping scenario, the indexes u of the first sequences used by different terminal devices of a same cell on a same RU are all different. Assuming that the first sequence is a Hadamard sequence, it can be learned based on Table 2 that, first sequences indicated by different indexes of the first sequences are also different. Namely, in this embodiment of this application, the first sequences used by the different terminal devices of the same cell on the same RU are different.

Optionally, in an embodiment of this application, in the group hopping scenario, for cells with cell identifiers 0 to 15, $C_{init}$ obtained by using the calculation manner $$C_{init} = \left\lfloor \frac{N_{ID}^{Ncell}}{N_{seq}^{RU}} \right\rfloor$$

in the conventional technology are the same, and further, obtained $f_{gh}(n_s)$ are the same. This means that for these cells, hopping distances of indexes u of first sequences in different RUs are the same. If indexes u of first sequences that are used by the first RUs and that are of respective reference signals (for example, the reference signals may be DMRSs) of terminal devices of different cells are the same, indexes u of first sequences used on subsequent RUs are different.

Assuming that the initializing value $C_{init}$ of the second sequence is equal to (the cell identifier of the first cell), based on the foregoing formula (13) or formula (14), it is assumed that each of first specified value and the second specified value may be equal to 16. For example, using an example in which one data block occupies two RUs, an NPUSCH is repeated twice, there are a total of four RUs, the first cell includes the first terminal device (it is assumed that an identifier of the first terminal device is an identifier 1), a second terminal device (it is assumed that an identifier of the second terminal device is an identifier 2), and a third terminal device (it is assumed that an identifier of the third terminal device is an identifier 3) that can transmit uplink data on a same time-frequency resource, the first parameter value corresponding to the first terminal device is 0, a second parameter value corresponding to the second terminal device is 1, and a third parameter value corresponding to the third terminal device is 2, a mapping relationship between the cell identifiers, the parameter values corresponding to the terminal devices, and indexes u of first sequences used by the RUs may be shown in Table 8. It can be learned from Table 8 that, in this case, the indexes u of the first sequences used on the RUs are different; the indexes u of the first sequences used by different terminal devices of a same cell on a same RU are different; and the indexes u of the first sequences used by different terminal devices of different cells on a same RU are different.

TABLE 8

| Cell identifiers | Parameter values | Identifiers of terminal devices | Index of a first sequence used by an RU 1 | Index of a first sequence used by an RU 2 | Index of a first sequence used by an RU 3 | Index of a first sequence used by an RU 4 |
|---|---|---|---|---|---|---|
| 0 | 0 | Identifier 1 | 1 | 5 | 7 | 9 |
|   | 1 | Identifier 2 | 2 | 6 | 8 | 10 |
|   | 2 | Identifier 3 | 3 | 7 | 9 | 11 |
| 1 | 0 | Identifier 1 | 3 | 10 | 4 | 6 |
|   | 1 | Identifier 2 | 4 | 11 | 5 | 7 |
|   | 2 | Identifier 3 | 5 | 12 | 6 | 8 |
| 2 | 0 | Identifier 1 | 9 | 6 | 10 | 4 |
|   | 1 | Identifier 2 | 10 | 7 | 11 | 5 |
|   | 2 | Identifier 3 | 11 | 8 | 12 | 6 |
| ... | ... | ... | ... | ... | ... | ... | used by the first RUs and that are of respective reference signals (for example, the reference signals may be DMRSs) of terminal devices of different cells are the same, indexes u of first sequences used on all subsequent RUs are all the same.

Based on this, in an embodiment of this application, an initializing value $C_{init}$ of the second sequence may be designed to be linearly related to the cell identifier of the first cell. For example, the initializing value $C_{init}$ of the second sequence is equal to (the cell identifier of the first cell)*A+B, or the initializing value $C_{init}$ of the second sequence is equal to (the cell identifier of the first cell+B)*A. Values of A and B are not limited in this embodiment of this application. In this way, for the cells with cell identifiers 0 to 15, because cell identifiers of different cells are different, obtained $f_{gh}(n_s)$ are different. This means that for these cells, hopping distances of indexes u of first sequences in different RUs are different. In this way, even if indexes u of first sequences that are It should be noted that, values of the indexes u of the first sequences in Table 8 are merely examples. Description is provided by using an example in which when $C_{init}=0$, $f_{gh}(n_s)=1, 5, 7, 9$; when $C_{init}=1$, $f_{gh}(n_s)=2, 9, 3, 5$; and when $C_{init}=2$, $f_{gh}(n_s)=7, 4, 8, 2$. When $f_{gh}(n_s)$ is another value, the values of the indexes u of the first sequences may be different from those in Table 8. This is not limited in this embodiment of this application.

S502. The first terminal device generates a first reference signal based on the first sequence indicated by the index of the first sequence.

Optionally, in an embodiment of this application, assuming that the first sequence is a Hadamard sequence, the second sequence is a Gold sequence, and the first reference signal is a DMRS, the first terminal device may generate the DMRS based on the foregoing formula (1) and formula (2). Details are not described herein again.

It should be noted that, in an embodiment of this application, if the second sequence is a Gold sequence, in the group hopping scenario, the initializing value $C_{init}$ of the Gold sequence in the calculation formula of $f_{gh}(n_s)$ is linearly related to the cell identifier of the first cell. In this case, c( ) in the foregoing formula (1) is initialized at a starting location of NPUSCH transmission, and Initialization seed $C_{init}=35$; or, c( ) in the foregoing formula (1) is initialized at the starting location of NPUSCH transmission, and the initialization seed is the initializing value of the Gold sequence in the calculation formula of $f_{gh}(n_s)$. This is not limited herein.

On one hand, it can be learned from the foregoing operation S501 that, the first sequences used by different terminal devices of a same cell on a same RU are different, so that reference signals generated based on the first sequences are also different. Further, the different terminal devices of the same cell may transmit uplink data on the same time-frequency resource by using, to the greatest extent, different reference signals, so that the network device can distinguish, to the greatest extent, the reference signals used by the different terminal devices, thereby correctly demodulating the uplink data of the different terminal devices.

On the other hand, it can be learned from the foregoing operation S501 that, assuming that the initializing value $C_{init}$ of the second sequence is equal to the cell identifier of the first cell, even if the indexes u of the first sequences that are used by the first RUs and that are of the respective reference signals (for example, the reference signals may be DMRSs) of terminal devices of different cells are the same, the indexes u of the first sequences used on the subsequent RUs are different. Further, assuming that the first sequence is a Hadamard sequence, it can be learned from Table 2 that, the first sequences indicated by the indexes of the first sequences are also different. In this way, the reference signals generated based on the first sequences indicated by the indexes of the first sequences are also different, so that interference between signals of the different cells can be avoided.

Figure 6:
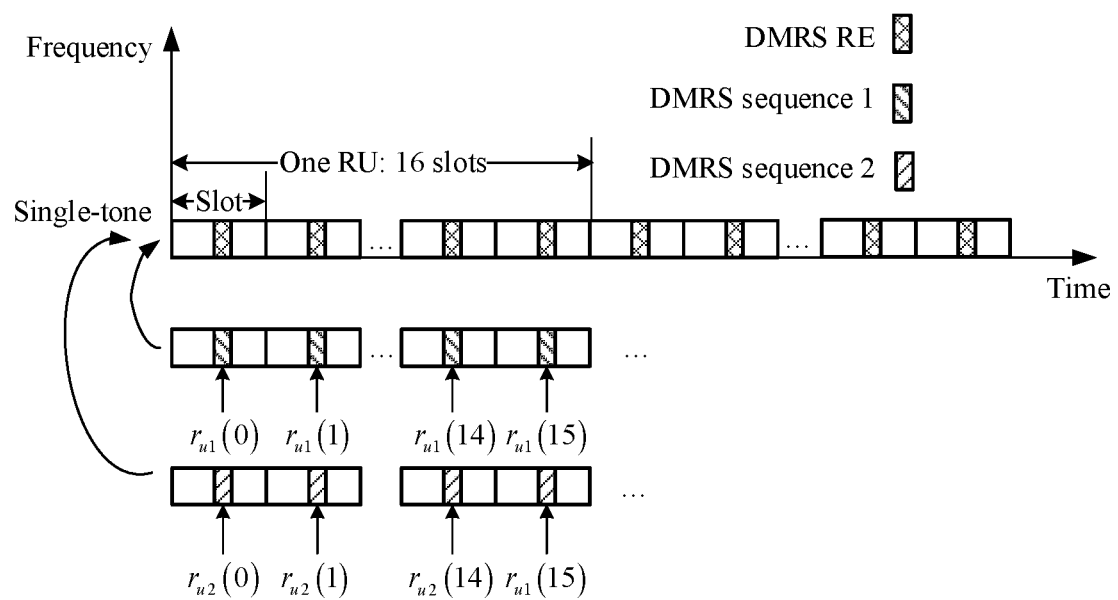
FIG. 6 is a schematic diagram of mapping a DMRS sequence on a DMRS RE according to an embodiment of this application.

For example, assuming that the reference signal is a DMRS, the first terminal device and the second terminal device in the plurality of terminal devices simultaneously transmit uplink data on a shared resource, the index u of the first sequence corresponding to the first terminal device is u1, and the index u of the first sequence corresponding to the second terminal device is u2, a mapping schematic diagram of mapping a DMRS sequence 1 obtained by the first terminal device based on u1 and a DMRS sequence 2 obtained by the second terminal device based on u2 onto a DMRS resource element (resource element, RE) of single tone may be shown in FIG. 6.

S503. The first terminal device sends the first reference signal to the network device.

Optionally, in an embodiment of this application, the first terminal device may send the first reference signal to the network device on an uplink grant-free resource. The uplink grant-free resource may be a dedicated resource, or a shared resource, or may include a part of dedicated source and a part of shared resource. This is not limited herein.

S504. The network device receives a second reference signal from the first terminal device.

S505. The network device determines the index of the first sequence based on the first parameter value corresponding to the first terminal device.

S506. The network device generates the first reference signal based on the first sequence indicated by the index of the first sequence.

For related descriptions of generating the first reference signal by the network device in operations S505 and S506, refer to related descriptions of generating the first reference signal by the first terminal device in operations S501 and S502. Details are not described herein again.

It should be noted that, in an embodiment of this application, there is no necessary execution sequence between operation S504 and operation S505 and operation S506, and operation S504 may be performed first, and then operation S505 and operation S506 are performed. Alternatively, operations S505 and S506 may be performed first, and then operation S504 is performed. Alternatively, operation S504 and operations S505 and S506 may be performed simultaneously. This is not limited in this embodiment of this application.

S507. The network device demodulates uplink data from the first terminal device based on the first reference signal and the second reference signal.

Optionally, in an embodiment of this application, that the network device demodulates uplink data from the first terminal device based on the first reference signal and the second reference signal may include: The network device performs signal estimation based on the first reference signal and the second reference signal, to obtain a channel estimation result, thereby demodulating the uplink data from the first terminal device based on the channel estimation result. For a specific implementation, refer to an existing implementation. Details are not described herein.

Based on the above, based on the method for receiving and sending a reference signal provided in this embodiment of this application, on one hand, because the plurality of terminal devices that can transmit the uplink data on the same time-frequency resource and that are of the same cell determine indexes of first sequences by using different parameter values, the determined indexes of the first sequences may be different. Further, reference signals generated based on the first sequences indicated by the indexes of the first sequences may also be different. Further, the different terminal devices of the same cell may transmit the uplink data on the same time-frequency resource by using, to the greatest extent, different reference signals, so that the network device can distinguish, to the greatest extent, the reference signals used by the different terminal devices, thereby correctly demodulating the uplink data of the different terminal devices. On the other hand, in this embodiment of this application, the initializing value $C_{init}$ of the second sequence may be linearly related to the cell identifier of the first cell. Therefore, even if the indexes u of the first sequences that are used by the first RUs and that are of the respective reference signals (for example, the reference signals may be DMRSs) of terminal devices of different cells are the same, the indexes u of the first sequences used on the subsequent RUs are different. Further, assuming that the first sequence is a Hadamard sequence, it can be learned from Table 2 that, the first sequences indicated by the indexes of the first sequences are also different. In this way, the reference signals generated based on the first sequences indicated by the indexes of the first sequences are also different, so that interference between signals of the different cells can be avoided.

The actions of the network device in the foregoing operations S501 to S507 may be performed by the processor 301 in the network device 30 shown in FIG. 3 by invoking the application code stored in the memory 302, to instruct the network device to perform. The actions of the first terminal device in the foregoing operations S501 to S507 may be performed by the processor 401 in the terminal device 40 shown in FIG. 3 by invoking the application code stored in the memory 402, to instruct the network device to perform. This is not limited in this embodiment.

It may be understood that, in the foregoing embodiments, the methods and/or operations implemented by the first terminal device may alternatively be implemented by a component (for example, a chip or a circuit) that may be used in the first terminal device, and the methods and/or operations implemented by the network device may alternatively be implemented by a component that may be used in the network device.

The foregoing mainly describes the solutions provided in the embodiments of this application from a perspective of interaction between network elements. Correspondingly, the embodiments of this application further provide a communications apparatus. The communications apparatus is configured to implement the foregoing methods. The communications apparatus may be the first terminal device in the foregoing method embodiment, or an apparatus including the first terminal device, or a component that may be used in the first terminal device, or the communications apparatus may be the network device in the foregoing method embodiment, or an apparatus including the network device, or a component that may be used in the network device. It may be understood that, to implement the foregoing functions, the communications apparatus includes corresponding hardware structures and/or software modules for performing the functions. A person skilled in the art should be easily aware that, in combination with the examples described in the embodiments disclosed in this specification, units and algorithm operations can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the communications apparatus based on the foregoing method embodiment. For example, each function module may be obtained through division corresponding to each function, or two or more functions may be integrated into one processing module. The integrated module may be implemented in a form of hardware, or may be implemented in a form of a software function module. It should be noted that, in this embodiment of this application, division into the modules is an example, and is merely logical function division. During actual implementation, another division manner may be used.

Figure 7:
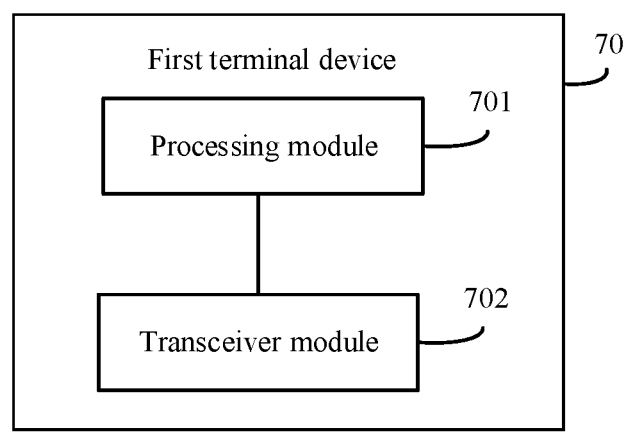
FIG. 7 is a schematic structural diagram of a first terminal device according to an embodiment of this application.

For example, the communications apparatus is the first terminal device in the foregoing method embodiment. FIG. 7 is a schematic structural diagram of a first terminal device 70. The first terminal device 70 includes a processing module 701 and a transceiver module 702. The transceiver module 702 may also be referred to as a transceiver unit, configured to implement a sending and/or receiving function. For example, the transceiver module 702 may be a transceiver circuit, a receiver and transmitter, a transceiver, or a communications interface.

The processing module 701 is configured to determine an index of a first sequence based on a first parameter value corresponding to the first terminal device, where the first parameter value is different from a parameter value corresponding to another terminal device in a plurality of terminal devices that can transmit uplink data on a same time-frequency resource and that are in a first cell. The processing module 701 is further configured to generate a reference signal based on the first sequence indicated by the index of the first sequence. The transceiver module 702 is configured to send the reference signal to a network device.

In an embodiment, the transceiver module 702 is further configured to receive a system message or higher layer signaling from the network device. The system message or the higher layer signaling includes the first parameter value corresponding to the first terminal device.

Alternatively, in an embodiment, the processing module 701 is further configured to determine the first parameter value corresponding to the first terminal device based on an identifier of the first terminal device.

In an embodiment, that the processing module 701 is configured to determine an index of a first sequence based on a first parameter value corresponding to the first terminal device includes: being configured to determine the index of the first sequence based on the first parameter value, a group hopping pattern, a sequence shift pattern, and one or a plurality of specified values, where the group hopping pattern is determined based on a second sequence, and the sequence shift pattern is determined based on a cell identifier of the first cell.

In an embodiment, the first parameter value, the group hopping pattern, the sequence shift pattern, the one or plurality of specified values, and the index of the first sequence satisfy formula $u=(f_{gh}(n_s)+f_{ss}+\text{First parameter value})\bmod A$ or formula $u=(f_{gh}(n_s)+f_{ss}+(\text{First parameter value})\bmod F)\bmod A$, where u represents the index of the first sequence; $f_{gh}(n_s)$ represents the group hopping pattern; $f_{ss}$ represents the sequence shift pattern; mod represents a modulo operation; and A represents a first specified value, and F represents a second specified value.

In another embodiment, that the processing module 701 is configured to determine an index of a first sequence based on a first parameter value corresponding to the first terminal device includes: being configured to determine the index of the first sequence based on the first parameter value and one or a plurality of specified values.

In an embodiment, the first parameter value, the one specified value, and the index of the first sequence satisfy formula $u=(\text{First parameter value})\bmod B$, where u represents the index of the first sequence; mod represents a modulo operation; and B represents a third specified value.

In still another embodiment, that the processing module 701 is configured to determine an index of a first sequence based on a first parameter value corresponding to the first terminal device includes: being configured to determine the index of the first sequence based on the first parameter value, a cell identifier of the first cell, and one or a plurality of specified values.

In an embodiment, the first parameter value, the cell identifier of the first cell, the plurality of specified values, and the index of the first sequence satisfy formula $u=(N_{ID}^{Ncell}\bmod C+\text{First parameter value})\bmod D$ or formula $u=(N_{ID}^{Ncell}\bmod C+(\text{First parameter value})\bmod E)\bmod D$, where u represents the index of the first sequence; $N_{ID}^{Ncell}$ represents the cell identifier of the first cell; mod represents a modulo operation; C represents a fourth specified value; D represents a fifth specified value; and E represents a sixth specified value.

All related content of the operations in the foregoing method embodiment may be referenced to function descriptions of corresponding function modules, and details are not described herein again.

In an embodiment, the first terminal device 70 is presented in a form of dividing each function module in an integrated manner. The "module" herein may refer to a specific ASIC, a circuit, a processor that executes one or more software or firmware programs, a memory, an integrated logic circuit, and/or other devices that can provide the foregoing functions. In a simple embodiment, a person skilled in the art may conceive of that the first terminal device 70 may be in a form of the terminal device 40 shown in FIG. 3.

For example, the processor 401 in the terminal device 40 shown in FIG. 3 may invoke the computer-executable instructions stored in the memory 402, to enable the terminal device 40 to perform the method for receiving and sending a reference signal in the foregoing method embodiment.

In an embodiment, functions/implementation processes of the processing module 701 and the transceiver module 702 in FIG. 7 may be implemented by the processor 401 in the terminal device 40 shown in FIG. 3 by invoking the computer-executable instructions stored in the memory 402. Alternatively, the function/implementation process of the processing module 701 in FIG. 7 may be implemented by the processor 401 in the terminal device 40 shown in FIG. 3 by invoking the computer-executable instructions stored in the memory 402. The function/implementation process of the transceiver module 702 in FIG. 7 may be implemented by using the transceiver 403 in the terminal device 40 shown in FIG. 3.

Because the first terminal device 70 provided in this embodiment can perform the foregoing method for receiving and sending a reference signal, for technical effects that can be obtained by the first terminal device 70, refer to the foregoing method embodiment. Details are not described herein again.

Figure 8:
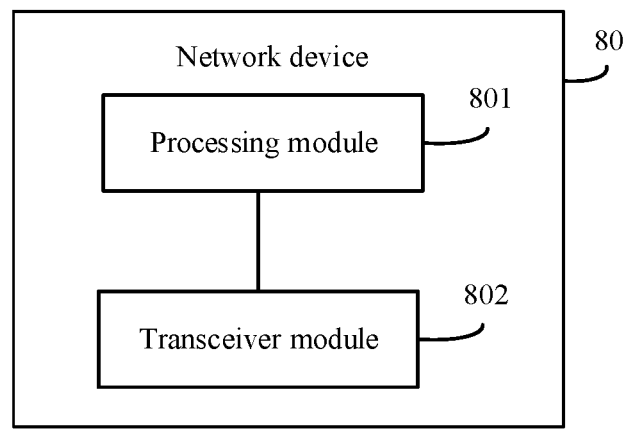
FIG. 8 is another schematic structural diagram of a network device according to an embodiment of this application.

Alternatively, for example, the communications apparatus is the network device in the foregoing method embodiment. FIG. 8 is a schematic structural diagram of a network device 80. The network device 80 includes a processing module 801 and a transceiver module 802. The transceiver module 802 may also be referred to as a transceiver unit, configured to implement a sending and/or receiving function. For example, the transceiver module 802 may be a transceiver circuit, a receiver and transmitter, a transceiver, or a communications interface.

The processing module 801 is configured to determine an index of a first sequence based on a first parameter value corresponding to a first terminal device, where the first parameter value is different from a parameter value corresponding to another terminal device in a plurality of terminal devices that can transmit uplink data on a same time-frequency resource and that are in a first cell. The processing module 801 is further configured to generate a first reference signal based on the first sequence indicated by the index of the first sequence. The transceiver module 802 is configured to receive a second reference signal from the first terminal device. The processing module 801 is configured to demodulate uplink data from the first terminal device based on the first reference signal and the second reference signal.

In an embodiment, the processing module 801 is further configured to determine, from a preset set, the first parameter value corresponding to the first terminal device, where the preset set includes parameter values that can be allocated to the plurality of terminal devices.

Alternatively, in an embodiment, the processing module 801 is further configured to determine the first parameter value corresponding to the first terminal device based on an identifier of the first terminal device.

In an embodiment, the transceiver module 802 is further configured to send a system message or higher layer signaling to the terminal device. The system message or the higher layer signaling includes the first parameter value corresponding to the first terminal device.

In an embodiment, that the processing module 801 is configured to determine an index of a first sequence based on a first parameter value corresponding to the first terminal device includes: being configured to determine the index of the first sequence based on the first parameter value, a group hopping pattern, a sequence shift pattern, and one or a plurality of specified values, where the group hopping pattern is determined based on a second sequence, and the sequence shift pattern is determined based on a cell identifier of the first cell.

In an embodiment, the first parameter value, the group hopping pattern, the sequence shift pattern, the one or plurality of specified values, and the index of the first sequence satisfy formula $u=(f_{gh}(n_s)+f_{ss}+\text{First parameter value})\mod A$ or formula $u=(f_{gh}(n_s)+f_{ss}+(\text{First parameter value})\mod F)\mod A$, where u represents the index of the first sequence; $f_{gh}(n_s)$ represents the group hopping pattern; $f_{ss}$ represents the sequence shift pattern; mod represents a modulo operation; and A represents a first specified value, and F represents a second specified value.

In another embodiment, that the processing module 801 is configured to determine an index of a first sequence based on a first parameter value corresponding to the first terminal device includes: being configured to determine the index of the first sequence based on the first parameter value and one or a plurality of specified values.

In an embodiment, the first parameter value, the one specified value, and the index of the first sequence satisfy formula $u=(\text{First parameter value})\mod B$, where u represents the index of the first sequence; mod represents a modulo operation; and B represents a third specified value.

In still another embodiment, that the processing module 801 is configured to determine an index of a first sequence based on a first parameter value corresponding to the first terminal device includes: being configured to determine the index of the first sequence based on the first parameter value, a cell identifier of the first cell, and one or a plurality of specified values.

In an embodiment, the first parameter value, the cell identifier of the first cell, the plurality of specified values, and the index of the first sequence satisfy formula $u=(N_{ID}^{Ncell} \mod C+\text{First parameter value})\mod D$ or $u=(N_{ID}^{Ncell} \mod C+(\text{First parameter value})\mod E)\mod D$, where u represents the index of the first sequence; $N_{ID}^{Ncell}$ represents the cell identifier of the first cell; mod represents a modulo operation; C represents a fourth specified value; D represents a fifth specified value; and E represents a sixth specified value.

All related content of the operations in the foregoing method embodiment may be referenced to function descriptions of corresponding function modules, and details are not described herein again.

In an embodiment, the network device 80 is presented in a form of dividing each function module in an integrated manner. The "module" herein may refer to a specific ASIC, a circuit, a processor that executes one or more software or firmware programs, a memory, an integrated logic circuit, and/or other devices that can provide the foregoing functions. In a simple embodiment, a person skilled in the art may conceive of that the network device 80 may be in a form of the network device 30 shown in FIG. 3.

For example, the processor 301 in the network device 30 shown in FIG. 3 may invoke the computer-executable instructions stored in the memory 302, to enable the network device 30 to perform the method for receiving and sending a reference signal in the foregoing method embodiment.

In an embodiment, functions/implementation processes of the processing module 801 and the transceiver module 802 in FIG. 8 may be implemented by the processor 301 in the network device 30 shown in FIG. 3 by invoking the computer-executable instructions stored in the memory 302. Alternatively, the function/implementation process of the processing module 801 in FIG. 8 may be implemented by the processor 301 in the network device 30 shown in FIG. 3 by invoking the computer-executable instructions stored in the memory 302. The function/implementation process of the transceiver module 802 in FIG. 8 may be implemented by using the transceiver 303 in the network device 30 shown in FIG. 3.

Because the network device 80 provided in this embodiment can perform the foregoing method for receiving and sending a reference signal, for technical effects that can be obtained by the network device 80, refer to the foregoing method embodiment. Details are not described herein again.

Optionally, the embodiments of this application further provide a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory, to instruct the communications apparatus to perform the method in any one of the foregoing method embodiments. Certainly, the memory may alternatively not be in the communications apparatus. When the communications apparatus is a chip system, the chip system may include a chip, or include a chip and other discrete devices. This is not limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatuses.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another operation, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and are intended to cover any of or all modifications, variations, combinations, or equivalents within the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method for sending a reference signal, comprising:
determining, by a first terminal device of a plurality of terminal devices in a first cell of a wireless communications system, an index of a first sequence based on a first parameter value corresponding to the first terminal device, wherein the first parameter value is different from a parameter value corresponding to another terminal device in the plurality of terminal devices, wherein the plurality of terminal devices are capable of transmitting uplink data on a same time-frequency resource, wherein the determining, by the first terminal device, the index of the first sequence based on the first parameter value corresponding to the first terminal device comprises:
determining, by the first terminal device, the index of the first sequence based on the first parameter value, a group hopping pattern, a sequence shift pattern, and one or more specified values, wherein the group hopping pattern is determined based on a second sequence, and the sequence shift pattern is determined based on a cell identifier of the first cell,
wherein the first parameter value, the group hopping pattern, the sequence shift pattern, the one or more specified values, and the index of the first sequence satisfy the following first formula:

$$u = (f_{gh}(n_s) + f_{ss} + \text{First parameter value}) \bmod A; \text{ or}$$

$$u = (f_{gh}(n_s) + f_{ss} + (\text{First parameter value}) \bmod F) \bmod A,$$
wherein u represents the index of the first sequence; $f_{gh}(n_s)$ represents the group hopping pattern; $f_{ss}$ represents the sequence shift pattern; mod represents a modulo operation; and A represents a first specified value, and F represents a second specified value, and wherein the first specified value A is equal to a quantity of continuous slots occupied by one resource unit (RU);

generating, by the first terminal device, a reference signal based on the first sequence indicated by the index of the first sequence; and sending, by the first terminal device, the reference signal to a network device.

2. The method according to claim 1, wherein the determining, by the first terminal device, an index of a first sequence based on a first parameter value corresponding to the first terminal device comprises:

determining, by the first terminal device, the index of the first sequence based on the first parameter value and one or more specified values.

3. The method according to claim 2, wherein the first parameter value, one of the specified values, and the index of the first sequence satisfy the following second formula:

$u=$(First parameter value)mod $B$, wherein u represents the index of the first sequence; mod represents a modulo operation; and B represents a third specified value.

4. The method according to claim 1, wherein the determining, by the first terminal device, an index of a first sequence based on a first parameter value corresponding to the first terminal device comprises:

determining, by the first terminal device, the index of the first sequence based on the first parameter value, a cell identifier of the first cell, and one or more specified values.

5. The method according to claim 4, wherein the first parameter value, the cell identifier of the first cell, the one or more specified values, and the index of the first sequence satisfy the following third formula:

$u=(N_{ID}^{Ncell} \bmod C+$First parameter value$) \bmod D$; or $u=(N_{ID}^{Ncell} \bmod C+$(First parameter value)mod $E) \bmod D$, wherein u represents the index of the first sequence; $N_{ID}^{Ncell}$ represents the cell identifier of the first cell; mod represents a modulo operation; C represents a fourth specified value; D represents a fifth specified value; and E represents a sixth specified value.

6. A method for receiving a reference signal, comprising:

determining, by a network device, an index of a first sequence based on a first parameter value corresponding to a first terminal device of a plurality of terminal devices in a first cell of a wireless communications system, the plurality of terminal devices capable of transmitting uplink data on a same time-frequency resource, wherein the first parameter value is different from a parameter value corresponding to another terminal device in the plurality of terminal devices, wherein the determining, by the first terminal device, the index of the first sequence based on the first parameter value corresponding to the first terminal device comprises:

determining, by the first terminal device, the index of the first sequence based on the first parameter value, a group hopping pattern, a sequence shift pattern, and one or more specified values, wherein the group hopping pattern is determined based on a second sequence, and the sequence shift pattern is determined based on a cell identifier of the first cell, wherein the first parameter value, the group hopping pattern, the sequence shift pattern, the one or more specified values, and the index of the first sequence satisfy the following first formula:

$u=(f_{gh}(n_s)+f_{ss}+$First parameter value$) \bmod A$; or $u=(f_{gh}(n_s)+f_{ss}+$(First parameter value)mod $F) \bmod A$, wherein u represents the index of the first sequence; $f_{gh}(n_s)$ represents the group hopping pattern; $f_{ss}$ represents the sequence shift pattern; mod represents a modulo operation; and A represents a first specified value, and F represents a second specified value, and wherein the first specified value A is equal to a quantity of continuous slots occupied by one resource unit (RU);

generating, by the network device, a first reference signal based on the first sequence indicated by the index of the first sequence;

receiving, by the network device, a second reference signal from the first terminal device; and demodulating, by the network device, uplink data from the first terminal device based on the first reference signal and the second reference signal.

7. The method according to claim 6, wherein the determining, by a network device, an index of a first sequence based on a first parameter value corresponding to the first terminal device comprises:

determining, by the network device, the index of the first sequence based on the first parameter value and one or more specified values.

8. The method according to claim 7, wherein the first parameter value, one of the specified values, and the index of the first sequence satisfy the following second formula:

$u=$(First parameter value)mod $B$, wherein u represents the index of the first sequence; mod represents a modulo operation; and B represents a third specified value.

9. The method according to claim 6, wherein the determining, by a network device, an index of a first sequence based on a first parameter value corresponding to the first terminal device comprises:

determining, by the network device, the index of the first sequence based on the first parameter value, a cell identifier of the first cell, and one or more specified values.

10. The method according to claim 9, wherein the first parameter value, the cell identifier of the first cell, the one or more specified values, and the index of the first sequence satisfy the following third formula:

$u=(N_{ID}^{Ncell} \bmod C+$First parameter value$) \bmod D$; or $u=(N_{ID}^{Ncell} \bmod C+$(First parameter value)mod $E) \bmod D$, wherein u represents the index of the first sequence; $N_{ID}^{Ncell}$ represents the cell identifier of the first cell; mod represents a modulo operation; C represents a fourth specified value; D represents a fifth specified value; and E represents a sixth specified value.

11. A first terminal device, comprising:

a processor; and a memory coupled to the processor to store instructions, which when executed by the processor, cause the processor to:

determine an index of a first sequence based on a first parameter value corresponding to the first terminal device, wherein the first terminal device is one of a plurality of terminal devices in a first cell of a wireless communications system, the plurality of terminal devices capable of transmitting uplink data on a same time-frequency resource, wherein the first parameter value is different from a parameter value corresponding to another terminal device in the plurality of terminal devices, wherein, to determine the index of the first sequence based on the first parameter value corresponding to the first terminal device, the processor is further caused to:

determine the index of the first sequence based on the first parameter value, a group hopping pattern, a sequence shift pattern, and one or more specified values, wherein the group hopping pattern is determined based on a second sequence, and the sequence shift pattern is determined based on a cell identifier of the first cell, wherein the first parameter value, the group hopping pattern, the sequence shift pattern, the one or more specified values, and the index of the first sequence satisfy the following first formula:

$u=(f_{gh}(n_s)+f_{ss}+\text{First parameter value}) \mod A$; or $u=(f_{gh}(n_s)+f_{ss}+(\text{First parameter value}) \mod F) \mod A$, wherein u represents the index of the first sequence; $f_{gh}(n_s)$ represents the group hopping pattern; $f_{ss}$ represents the sequence shift pattern; mod represents a modulo operation; and A represents a first specified value, and F represents a second specified value, and wherein the first specified value A is equal to a quantity of continuous slots occupied by one resource unit (RU), and generate a reference signal based on the first sequence indicated by the index of the first sequence; and a transceiver configured to send the reference signal to a network device.

12. The first terminal device according to claim 11, wherein in determining the index of a first sequence based on a first parameter value corresponding to the first terminal device, the processor is further caused to:

determine the index of the first sequence based on the first parameter value and one or more specified values.

13. The first terminal device according to claim 12, wherein the first parameter value, the one specified value, and the index of the first sequence satisfy the following second formula:

$u=(\text{First parameter value}) \mod B$, wherein u represents the index of the first sequence; mod represents a modulo operation; and B represents a third specified value.

14. The first terminal device according to claim 11, wherein in determining the index of a first sequence based on a first parameter value corresponding to the first terminal device, the processor is further caused to:

determine the index of the first sequence based on the first parameter value, a cell identifier of the first cell, and one or more specified values.

* * * * *